(12) United States Patent
Zamani et al.

(10) Patent No.: US 12,647,284 B2
(45) Date of Patent: Jun. 2, 2026

(54) OFFLINE INTERACTION SYSTEM AND METHOD USING CRYPTOGRAPHY

(71) Applicant: Visa International Service Association, San Francisco, CA (US)

(72) Inventors: Mahdi Zamani, Palo Alto, CA (US); Ranjit Kumaresan, Sunnyvale, CA (US); Mihai Christodorescu, Belmont, CA (US); Cuy Sheffield, Menlo Park, CA (US); Benjamin Price, Rockingham, VA (US); Wanyun Gu, Menlo Park, CA (US); Minghua Xu, Austin, TX (US); Srinivasan Raghuraman, Cambridge, MA (US); Muhammad Saad, Orlando, FL (US); Mustafa Ozdayi, Dallas, TX (US); Mohammad Mohsen Minaei Bidgoli, San Jose, CA (US); Sourav Das, Champaign, IL (US)

(73) Assignee: Visa International Service Association, San Francisco, CA (US)

( * ) Notice: Subject to any disclaimer, the term of this patent is extended or adjusted under 35 U.S.C. 154(b) by 170 days.

(21) Appl. No.: 18/005,054

(22) PCT Filed: Jul. 21, 2021

(86) PCT No.: PCT/US2021/042645
§ 371 (c)(1),
(2) Date: Jan. 10, 2023

(87) PCT Pub. No.: WO2022/020523
PCT Pub. Date: Jan. 27, 2022

(65) Prior Publication Data
US 2023/0344649 A1 Oct. 26, 2023

Related U.S. Application Data

(60) Provisional application No. 63/125,305, filed on Dec. 14, 2020, provisional application No. 63/090,104, (Continued)

(51) Int. Cl.
| | |
|---|---|
| *H04L 29/06* | (2006.01) |
| *H04L 9/00* | (2022.01) |
| *H04L 9/32* | (2006.01) |

(52) U.S. Cl.
CPC .......... *H04L 9/3265* (2013.01); *H04L 9/3247* (2013.01); *H04L 9/50* (2022.05); *H04L 2209/56* (2013.01)

(58) Field of Classification Search
CPC ....... H04L 9/3265; H04L 9/3247; H04L 9/50; H04L 2209/56; H04L 9/3239;
(Continued)

(56) References Cited

U.S. PATENT DOCUMENTS

| | | | |
|---|---|---|---|
| 2007/0168297 A1* | 7/2007 | Cheng | G06Q 20/06 |
| | | | 705/65 |
| 2015/0278795 A1 | 10/2015 | Jiang et al. | |

(Continued)

FOREIGN PATENT DOCUMENTS

| | | |
|---|---|---|
| EP | 3474211 A1 | 4/2019 |
| WO | 2022192658 A1 | 9/2022 |

OTHER PUBLICATIONS

EP21846713.2 , "Extended European Search Report", Jan. 2, 2024, 9 pages.
(Continued)

*Primary Examiner* — Joseph P Hirl
*Assistant Examiner* — Leynna Truvan
(74) *Attorney, Agent, or Firm* — Kilpatrick Townsend & Stockton LLP

(57) ABSTRACT
A method includes a first device receiving, from a second device, an interaction request message comprising an (Continued)

amount and a second device certificate. The first device can verify the second device certificate using a server computer public key corresponding to a server computer private key. A trusted application in a secure element of the first device can determine whether or not the amount is less than an offline amount stored in the secure element. If the amount is less than the offline amount, the trusted application can determine an updated offline amount based on the amount. The trusted application can generate an interaction response message comprising the amount and a trusted application certificate. The first device can then provide the interaction response message to the second device.

20 Claims, 9 Drawing Sheets

Related U.S. Application Data filed on Oct. 9, 2020, provisional application No. 63/055,761, filed on Jul. 23, 2020.

(58) Field of Classification Search
CPC . H04L 63/0823; H04L 9/3255; H04L 1/1628; H04L 9/3263; H04L 9/3268; H04L 9/0825; H04L 9/30; H04L 9/32; H04L 9/321; H04L 9/0618; H04L 41/045; H04L 63/0442; H04L 63/123; H04L 63/062; H04L 63/064; H04L 67/1091; H04L 2209/72; G06Q 20/02; G06Q 20/10; G06Q 20/322; G06Q 20/3227; G06Q 20/36; G06Q 20/382; G06Q 20/38215; G06Q 20/3829; H04M 1/7243; H04M 2242/08; H04M 2215/0156; H04M 15/8221; H04M 15/844; H04M 17/206; H04M 2017/243; H04M 2203/4581; H04N 21/26606; H04N 1/32776; H04N 21/8545; H04N 21/27; H04N 21/63775; H04N 2201/0046; H04N 21/64792; H04Q 3/0095; H04W 12/106; H04W 88/023; G06F 3/01; G06F 3/011; G06F 3/017; G06F 3/048; G06F 3/0482; G06F 3/0605; G06F 9/546; G06F 16/2423; G06F 2221/2133; G06F 2209/482; G06F 2209/541; G06F 2211/008; G06K 2019/06253; G06K 7/10475; G05B 2219/23237; G05B 2219/25111; G05B 2219/25238; G05B 2219/31175; G05B 2219/31208; G05B 2219/33243; G05B 2219/23254; G05B 2219/35431; G05B 2219/37439; G05B 2219/37453; G05B 2219/25423; G05B 2219/42258; G01B 9/02089; G05D 1/656; G06V 10/235; G06V 30/387; G06V 10/95; G07B 2017/00774; G07B 2017/00758; G07B 2017/00895; G07B 2017/00911; G07B 2017/00056; G07B 2017/00766; G07F 7/127; G08B 21/0222; G08B 25/007; G11B 20/00855; G11B 20/00869; G11B 20/00239; G10H 2220/091; G10K 2210/3041
See application file for complete search history.

(56) References Cited

U.S. PATENT DOCUMENTS

| | | | |
|---|---|---|---|
| 2017/0076275 A1 | 3/2017 | Mutisya | |
| 2018/0260795 A1 | 9/2018 | Maenpaa et al. | |
| 2018/0300717 A1 | 10/2018 | Haque et al. | |
| 2019/0114631 A1 | 4/2019 | Madhu et al. | |
| 2019/0392417 A1 | 12/2019 | Li et al. | |
| 2020/0126062 A1 | 4/2020 | Sun | |
| 2020/0265418 A1* | 8/2020 | Lee | G06Q 20/40145 |
| 2020/0280855 A1* | 9/2020 | Avetisov | H04L 63/20 |
| 2020/0404495 A1 | 12/2020 | Hedge et al. | |

OTHER PUBLICATIONS

Jayasinghe et al., "Extending EMV Tokenised Payments to Offline-Environments", Institute of Electrical and Electronics Engineers Trustcom/BigDataSE/ISPA, Aug. 23, 2016, pp. 443-450.
PCT/US2021/042645 , "International Search Report and Written Opinion", Nov. 2, 2021, 11 pages.
SG11202300407v, "Written Opinion", May 27, 2025, 8 pages.

* cited by examiner

OFFLINE INTERACTION SYSTEM AND METHOD USING CRYPTOGRAPHY

CROSS-REFERENCES TO RELATED APPLICATIONS

This application is a National Stage of International Application No. PCT/US2021/042645, which claims the benefit of U.S. Provisional Patent Application Nos. 63/055, 761, filed on Jul. 23, 2020, 63/090,104, filed on Oct. 9, 2020, and 63/125,305, filed on Dec. 14, 2020, which are incorporated by reference in their entirety for all purposes.

BACKGROUND

Traditionally, digital interactions are made over account-based systems, where the ownership of funds is tied to user identities. Digital interaction systems are typically based on tokens that exist as an object, where the ownership of funds is determined by user's access to a private cryptographic key. However, digital interactions are missing many aspects present in physical (e.g., not digital) interactions. One of the core features of physical funds is the ability to interact offline in a point-to-point manner without requiring an intermediary. This enables physical funds to function as a resilient interaction system that users and resource providers can use to interact without the need to rely on third parties.

Existing interaction networks can provide some form of offline digital interactions for situations where an access device cannot connect to authorization computers for authorization. However, such methods are unsecure. For example, a user may not actually have necessary funds to perform the interaction. Yet, this will not be known to the resource provider until after the interaction is complete and when the resource provider goes back online.

Embodiments solve these and other problems individually and collectively.

BRIEF SUMMARY

One embodiment is related to a method comprising: receiving, by a first device from a second device, an interaction request message comprising an amount and a second device certificate; verifying, by the first device, the second device certificate using a server computer public key corresponding to a server private key; determining, by a trusted application in a secure element of the first device, whether or not the amount is less than an offline amount stored in the secure element; if the amount is less than the offline amount, determining, by the trusted application, an updated offline amount based on the amount; generating, by the trusted application, an interaction response message comprising the amount and a trusted application certificate; signing, by the trusted application, the interaction response message using a trusted application private key to produce an interaction response message signature; and providing, by the first device, the interaction response message including the interaction response message signature to the second device.

Another embodiment is related to a first device comprising: a processor; and a computer readable medium coupled to the processor, the computer readable medium comprising code, executable by the processor, to implement a method comprising: receiving, by the first device from a second device, an interaction request message comprising an amount and a second device certificate; verifying the second device certificate using a server computer public key corresponding to a server private key used to sign the second device certificate; determining, by a trusted application in a secure element of the first device, whether or not the amount is less than an offline amount stored in the secure element; if the amount is less than the offline amount, determining, by the trusted application, an updated offline amount based on the amount; generating, by the trusted application, an interaction response message comprising the amount and a trusted application certificate; signing, by the trusted application, the interaction response message using a trusted application private key to produce an interaction response message signature; and providing, by the first device, the interaction response message including the interaction response message signature to the second device.

Another embodiment is related to a method comprising: generating, by a second device, an interaction request message comprising an amount and a second device certificate; providing, by the second device to a first device, the interaction request message, wherein the first device verifies the second device certificate using a server computer public key corresponding to a server private, determines whether or not the amount is less than an offline amount stored in a secure element on the first device, determines an updated offline amount based on the amount, generates an interaction response message comprising the amount and a trusted application certificate, and signs the interaction response message using a trusted application private key to produce an interaction response message signature; receiving, by the second device, the interaction response message including the interaction response message signature; and temporarily storing, by the second device, the interaction response message.

Further details regarding embodiments of the disclosure can be found in the Detailed Description and the Figures.

DETAILED DESCRIPTION

Figure 1:
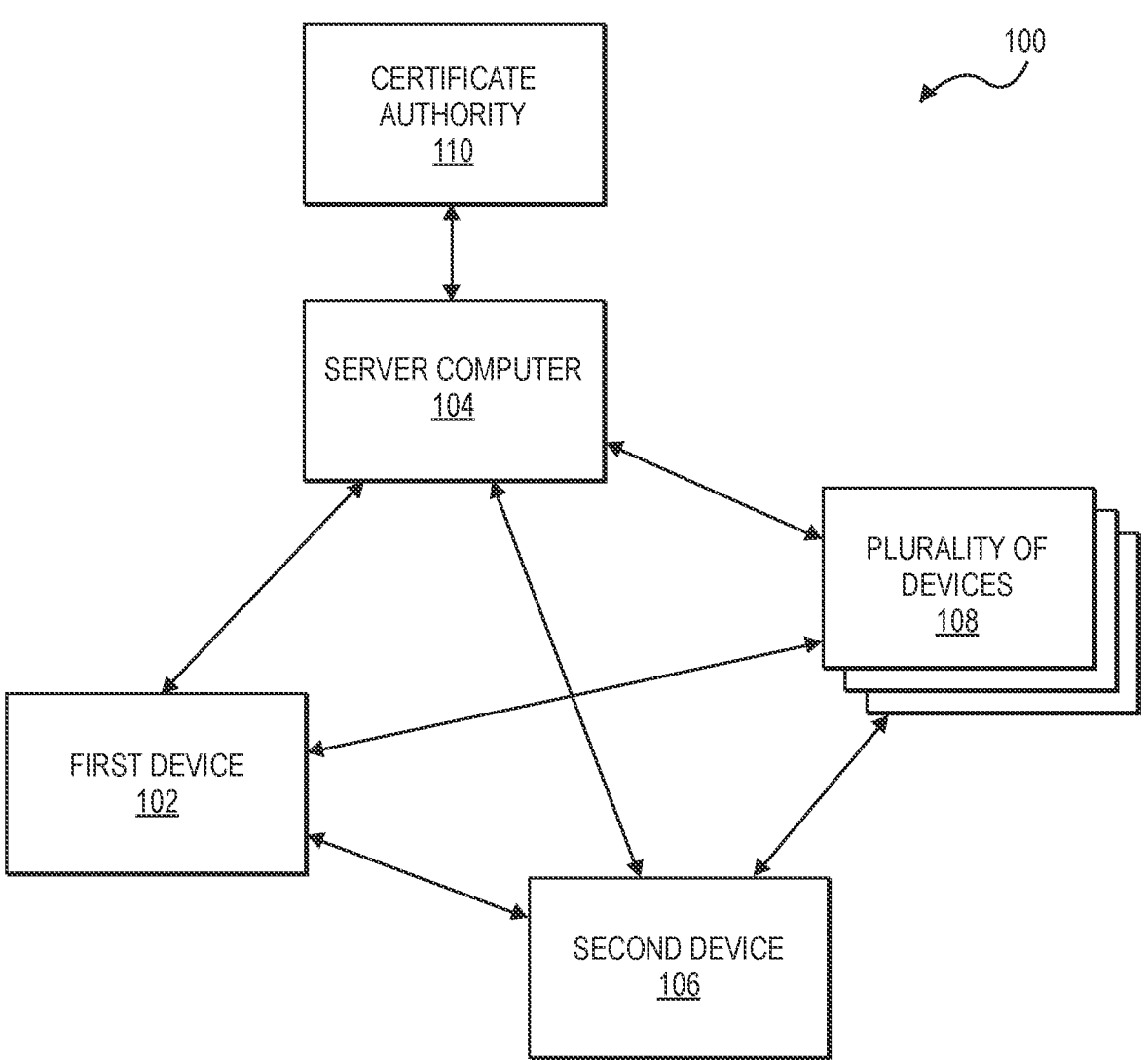
FIG. 1 shows a block diagram of an interaction processing system according to embodiments.

Prior to discussing embodiments of the disclosure, some terms can be described in further detail.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. There are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user" may include an individual. In some embodiments, a user may be associated with one or more personal accounts and/or mobile devices. The user may also be referred to as a cardholder, account holder, or consumer in some embodiments. In some embodiments, a resource provider can be a user and may operate a user device.

A "secure element" can include an element that is secure. A secure element can include a cryptographically secure computer-on-a-chip or microprocessor. A secure element can carry out cryptographic operations and may be embedded in a packaging with one or more physical security measures. In some embodiments, a secure element can include a component that can perform a function securely. A secure element may be a memory that securely stores data, such that its access is protected. A secure element can include a trusted execution environment on a secure area of a processor. An example of a secure element is a universal integrated-circuit card (UICC). Another example of a secure element is an embedded secure element, an embedded hardware component in a larger mechanical or electrical system. Another example of a secure element is a hardware security module (HSM), which is a physical computing device that can safeguard and manage cryptographic keys for authentication and provide crypto-processing functions.

A "trusted execution environment" (TEE) can include a secure area for processing data. A trusted execution environment can be a software stack stored on a read-only memory (ROM). A trusted execution environment can be included within a secure element. A trusted execution environment software stack can include of a set of resources to access the secure element, a trusted operating system (TOS) that provides a developer access to the underlying secure element, and one or more trusted applications (TA) that implement application-specific functionalities within the trusted application environment.

In some embodiments, a trusted execution environment can be an isolated execution environment that provides security features such as isolated execution, integrity of applications executing with the trusted execution environment, along with confidentiality of their assets. A trusted execution environment can offer an execution space that provides a higher level of security for trusted applications running on the device than a rich operating system and more functionality than a secure element alone.

A "trusted application" can include an application that is implemented within a trusted execution environment. A trusted application may perform specific functionalities. A trusted application can be paired with an application-specific client application (CA) that resides outside of the isolated trusted execution environment space and provides user-facing functionalities by interacting with the trusted application through the trusted operating system.

An "access device" may be any suitable device that provides access to a remote system. An access device may also be used for communicating with a coordination computer, a communication network, or any other suitable system. An access device may generally be located in any suitable location, such as at the location of a merchant. An access device may be in any suitable form. Some examples of access devices include POS or point of sale devices (e.g., POS terminals), cellular phones, personal digital assistants (PDAs), personal computers (PCs), tablet PCs, hand-held specialized readers, set-top boxes, electronic cash registers (ECRs), vending machines, automated teller machines (ATMs), virtual cash registers (VCRs), kiosks, security systems, access systems, and the like. An access device may use any suitable contact or contactless mode of operation to send or receive data from, or associated with, a mobile communication or payment device. For example, access devices can have card readers that can include electrical contacts, radio frequency (RF) antennas, optical scanners, bar code readers, or magnetic stripe readers to interact with portable devices such as payment cards. In some embodiments, an access device can be a user device operated by a second user, when a user device is operated by a first user.

An "interaction" may include a reciprocal action or influence. An interaction can include a communication, contact, or exchange between parties, devices, and/or entities. Example interactions include a transaction between two parties and a data exchange between two devices. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "amount" can include a quantity of something. An amount can include a total of a thing or things in number, size, value, or extent.

An "offline amount" can include a quantity of something that may be used when offline (i.e., when direct communication with a server computer is not present). An offline amount can be stored locally on a user device. For example, an offline amount can be stored in a secure element on a user device. An offline amount can be utilized during an offline interaction. For example, a first user can select to provide an amount to a second user while the first user's device is not connected to or in communication with a server computer (e.g., is not online). The first device can deduct the amount to be provided from the offline amount stored in the secure element.

An "online amount" can include a quantity of something that may be used when online. An online amount can be stored on a server computer. For example, a plurality online amounts associated with a plurality of users can be stored on a server computer and/or a database maintained by the server computer. In some embodiments, an online amount can be utilized during an online interaction. In other embodiments, an amount from the online amount on a server computer can be transferred to an offline amount on a user device. For example, a server computer can deduct an amount from an online amount associated with a first user, then provide the amount in a secure message to a first device. The first device can include the received amount into an offline amount stored in a secure element.

A "resource provider" may be an entity that can provide a resource such as goods, services, information, and/or access. Examples of resource providers includes merchants, data providers, transit agencies, governmental entities, venue and dwelling operators, etc.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

The term "public/private key pair" may include a pair of linked cryptographic keys generated by an entity. The public key may be used for functions such as encrypting a message to send to the entity or for verifying a digital signature which was supposedly made by the entity. The private key may be used for functions such as decrypting a received message or applying a digital signature. The public key can be authorized by a certificate authority, which can store the public key in a database and distribute it to any other entity which requests the public key. The private key can be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "digital signature" may include a type of electronic signature. A digital signature may encrypt documents with digital codes that can be difficult to duplicate. In some embodiments, a digital signature may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document and/or data file. In some cases, the certificate or the digital certificate may be a device certificate. In some embodiments, a digital certificate may use a digital signature to bind a public key with data associated with an identity. A digital certificate may be used to prove the ownership of a public key. The certificate may include one or more data fields, such as the legal name of the identity, a serial number of the certificate, a valid-from and valid-to date for the certificate, certificate related permissions, etc. A certificate may contain a "valid-from" date indicating the first date the certificate is valid, and a "valid-to" date indicating the last date the certificate is valid. A certificate may also contain a hash of the data in the certificate including the data fields. A certificate can be signed by a certificate authority.

A "certificate authority" may include an entity that issues digital certificates. A certificate authority may prove its identity using a certificate authority certificate, which includes the certificate authority's public key. A certificate authority certificate may be signed by another certificate authority's private key or may be signed by the same certificate authority's private key. The latter is known as a self-signed certificate. The certificate authority may maintain a database of all certificates issued by the certificate authority. The certificate authority may maintain a list of revoked certificates. The certificate authority may be operated by an entity, for example, a processing network entity, an issuer, an acquirer, a central bank etc.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Described herein is an offline interaction system (OIS) that allows a user to perform a digital interaction with another user or resource provider while both parties are temporarily offline from interaction intermediaries (e.g., network processing computers, certificate authorities, transport computers, authorizing entity computers, etc.; or, in some embodiments, the Internet). The offline interaction system can be used to instantly transfer any suitable form of digital currency offline over a point-to-point channel, achieving virtually unbounded throughput and real-time interaction latency.

Various embodiments can ensure that funds cannot be double spent (e.g., a user cannot utilize an amount multiple times) during offline interactions as no trusted intermediary is present to protect against replay attacks. Embodiments present an offline interaction system protocol that prevents double spending by utilizing digital signatures generated by trusted execution environments (TEEs), which are available on user devices (e.g., smartphones, tablets, etc.). While a trusted execution environment brings the primary point of trust to an offline device, an offline interaction system can utilize several cryptographic protocols to ensure the secure exchange of funds between multiple TEE-enabled devices, and hence ensure a reliable and secure interaction processing system.

Various embodiments, described herein, provide for an offline interaction system that allows a user (e.g., a customer) to perform digital interactions with another user (e.g., a resource provider or a second user) while both users are temporarily offline from intermediary devices. Next, embodiments construct the offline interaction system protocol that allows point-to-point authorization of offline interactions using a public key infrastructure that significantly reduces the onboarding overhead of participants compared to existing digital interaction systems. Once provisioned, offline interaction system digital wallets can securely sign and transmit interaction messages directly with each other over any suitable communication channel without requiring an intermediary to authorize and settle the interaction. Receiving offline interaction system digital wallets can submit signed interaction messages, which were received when offline, to an authorizing entity computer (e.g., via a transport computer, a network processing computer, and/or any other device described herein) with guaranteed settlement of those interactions in order to withdraw funds from the offline interaction system.

A. Overview of Various Embodiments

Consider two devices, a first device and a second device, that hold online accounts with a server computer S. Various embodiments provide that an account maintains information about the amount of money (e.g., a balance) that the user of a device holds at the server computer S. One goal of an offline interaction system protocol according to embodiments is to allow a first device to interact with a second device to provide an amount denoted by x from the first device's account to the second device's account with the server computer S without either device communicating with the server computer S during the interaction. The first device (e.g., a sender device) can include a secure element $D_A$ that can securely store data and execute code via a trusted execution environment (TEE). Some embodiments may not require the second device (e.g., a receiving device) to include a secure element with a trusted execution environment. In the following, a trusted execution environment model and the main components of various embodiments are described. Then, the offline interaction system protocols to set up the devices and perform offline interactions will be described.

A trusted execution environment can be a software stack stored on a read-only memory (ROM) within a secure element. The stack includes a set of resources to access the secure element, a trusted operating system that provides a developer access to the underlying secure element, and one or more trusted applications (TA) that implement application-specific functionalities within the trusted execution environment (see Protocol 5). A trusted application can be paired with an application-specific client application (CA) that resides outside of the isolated trusted execution environment space and provides user-facing functionalities by interacting with the trusted application through the trusted operating system.

The offline interaction system can include a server, a sender client application, a receiver client application, and a trusted application. The server can provide functionalities to register and set up user devices and manage user accounts. The sender client application can be deployed on the first device. The sender client application can provide a user interface to issue offline interactions by interacting with the trusted application, and to interact with the server computer S to register the sender client application and the trusted execution environment. The receiver client application can be deployed on the second device. The receiver client application can provide the user interface to receive and verify offline interactions, and to interact with the server computer S to register the client application and claim offline interactions. In some embodiments, the receiver client application may not interact with a trusted execution environment. In some embodiments, a device can include both a sender client application and a receiver client application. For example, if the first device is requesting funds from another client (e.g., device C), then the first device can include the receiver client application and the sender client application. The trusted application can be deployed on the first device (e.g., the sender device). The trusted application can be included within a trusted execution environment. The trusted application can provide offline interaction system specific functionalities to securely access the secure element and manage the client's offline amount. The trusted application deployed on the first device can be denoted by $T_A$.

1. Setup Protocol

In various embodiments, the offline interaction system protocol can have both clients involved in an interaction (e.g., users and/or resource providers) register with the server computer S during a one-time, online setup to establish asymmetric cryptographic keys that can later be used to issue and verify offline interactions. The online setup also allows the first device to initialize a trusted execution environment jointly with the server computer S and the first device's ($D_A$'s) manufacturer. The trusted execution environment setup can include three phases: (1) remote attestation to allow either the manufacturer or the server computer S to remotely verify the validity of the trusted execution environment stack; (2) trusted application provisioning to allow either the manufacturer or the server computer S to securely deploy a trusted application inside the TEE; and (3) trusted application registration to allow the trusted application to establish a signing key pair, register the signing key pair with the server computer S, and obtain a certificate attesting to the validity of the signing key pair.

2. Deposit Protocol

In various embodiments, the client A may need to initially deposit funds into the secure element when the first device is online, such that the first device can later be able to perform offline interactions. For example, the first device can request the server computer S to deposit an amount of x funds from an online amount stored at the server computer S and associated with the client A into an offline amount stored in the trusted application $T_A$. The server computer S responds with a signature showing that x was deducted from client A's online amount. The client trusted application verifies the signature with the server's public verification key and adds x to the offline amount stored in the trusted application $T_A$.

3. Offline Interaction Protocol

An offline interaction can be initiated by the receiver device (e.g., a second device), which sends an interaction request message to the first device. The interaction request message can include second device's certificate. Upon receiving the interaction request message, the first device invokes the trusted application $T_A$ to securely deduct the interaction amount from the trusted application's $T_A$'s amount and create a signed interaction response message P including the interaction amount and the certificates of both devices (e.g., the sender certificate and the receiver certificate). Device A sends the interaction response message P to the second device. After receiving the interaction response message, P, the second device verifies the first device's signature and certificate. Device B can then ensure that the interaction response message contains B's certificate (e.g., the receiver certificate). If each verification is successful, then the second device accepts the interaction and can store the interaction response message P.

4. Claim Protocol

If the second device wants to add the amount of the interaction as indicated in the interaction response message P that was received offline from the first device to an online amount associated with the second device and stored at the server computer S, then the second device can invoke a claim protocol. During the claim protocol, the second device sends the interaction response message P to the server computer S. The server computer S verifies the validity of the interaction response message P and checks if the interaction response message P was not previously marked as spent using an interaction log stored by the server computer S. If all verifications succeed, then the server computer S can add the amount indicated in the interaction response message P to B's online amount and adds the interaction response message P to the interaction log.

5. Collect Protocol

In various embodiments, the second device can include a secure element with a trusted application $T_B$ setup similar to the trusted application of the first device. In some embodiments, the second device can attempt to make an offline interaction using the amount previously received in the interaction response message P from the first device without going online. To do so, the second device can invoke the collect protocol to add the amount as indicated in the interaction response message P into the trusted application's $T_B$'s offline amount. This can allow the second device to perform an interaction utilizing the amount offline in a similar way that the first device performed the interaction above.

6. Withdraw Protocol

In some embodiments, the first device can request to move funds from the trusted application $T_A$ to an online amount stored at the server computer S. For example, the first device can invoke a withdraw protocol that invokes $T_A$. Withdraw to deduct the amount from the trusted application $T_A$ and then provide a message signed with the trusted application's $T_A$'s signing key to the first device. The first device then forwards the signed withdraw message to the server computer S, which then adds the amount to an online amount associated with the first device after verifying the signature.

7. Replay and Rollback Protection

To protect against malicious intermediaries (e.g., malicious certificate authority) replaying the messages exchanged between the server computer S and the trusted application $T_A$ as well as messages between the first device and the second device, each device can maintain monotonically-increasing counters that are incremented after every round of communication between a pair of devices. In some embodiments, the server computer S and the trusted application $T_A$ can include the latest value of their counter in their signed messages such that the receiver can verify the uniqueness and ordering of all messages according to their local counter, which can be synchronized after every exchange. In some embodiments, the first device and the second device can include a counter in messages sent to other devices.

B. Offline Interaction System

FIG. 1 shows a system 100 according to embodiments of the disclosure. The system 100 comprises a first device 102, a server computer 104, a second device 106, a plurality of devices 108, and a certificate authority 110. The first device 102 can be in operative communication with the server computer 104, the second device, and one or more devices of the plurality of devices 108. The server computer 104 can be in operative communication with the certificate authority 110. In some embodiments, when offline, the first device 102 can communicate with the second device 106 via a short-range communication channel (e.g., Bluetooth, nearfield communication, etc.). In some embodiments, when online, the first device 102 can communication with the server computer 104 via a long-range communication channel (e.g., over the air communications, etc.). However, it is understood that embodiments are not limited thereto.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The first device 102 can include a user device operated by a user (e.g., a phone). The first device 102 can include a secure element as described in further detail herein. The user can utilize the first device 102 to perform an interaction (e.g., a transaction, a data transfer, etc.) with the second device 106. The first device 102 can perform a transaction with the second device 106 when the first device 102 and the second device 106 are offline (e.g., not connected to the server computer 104). The second device 106 can include a resource provider device operated by a resource provider (e.g., a phone).

The server computer 104 can include a remote computer. The server computer 104 can provide an offline amount to the first device 102 to be stored in a secure element of the first device 102. For example, the first device 102 can request an offline amount from the server computer 104. In other situations, the server computer 104 can push an offline amount to the first device 102.

The first device 102 and the second device 106 can perform an offline interaction. In some embodiments, the first device 102 can perform an interaction with one or more devices of the plurality of devices 108, which can include resource provider devices and/or user devices. The plurality of devices 108 can include any suitable number of user devices and/or resource provider devices.

In some embodiments, the second device 106 receives an offline amount from the first device 102. The second device 106 then performs a second offline transaction with a device of the plurality of devices 108.

In other embodiments, the second device 106 receives the offline amount from the first device 102. The second device 106 then goes online and connects to the server computer 104. The second device 106 requests to collect an amount equal to the received offline amount.

The certificate authority 110 can create and issue certificates to the server computer 104. The certificate authority 110 may include one or more server computers. In some embodiments, the certificate authority 110 may be capable of issuing certificates to resource provider device, authorizing entity computers, transport computers, sever computer, network processing computers, user devices, etc. The certificate authority 110 may be capable of generating a certificate authority key pair. In some embodiments, the certificate authority 110 may be in operative communication with and/or operatively coupled to the server computer 104 and may generate certificates on behalf of the server computer 104. In some embodiments, a root certificate authority, not shown, can issue certificates to the certificate authority 110. The certificate authority 110 can then utilize the certificate obtained from the root certificate authority to issue certificates to the server computer 104.

C. User Device

Figure 2:
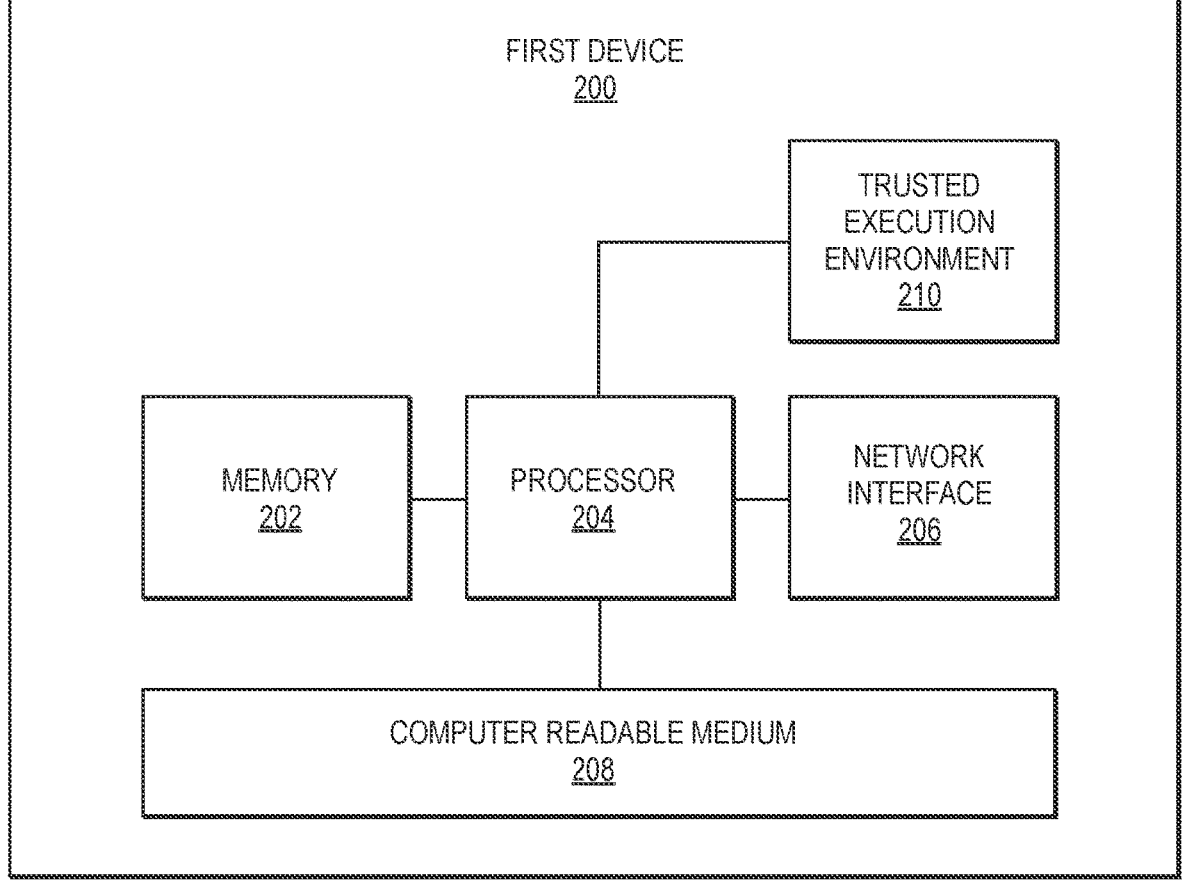
FIG. 2 shows a block diagram of components of a first device that can be a user device according to embodiments.

FIG. 2 shows a block diagram of a first device according to embodiments. The exemplary first device 200 may comprise a processor 204. The processor 204 may be coupled to a memory 202, a network interface 206, a computer readable medium 208, and a trusted execution environment 210. The computer readable medium 208 can comprise any suitable modules.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving, from a second device, an interaction request message comprising an amount and a second device certificate; verifying the second device certificate using a server computer public key corresponding to a server private key used to sign the second device certificate; determining, by a trusted application in a secure element of the first device, whether or not the amount is less than an offline amount stored in the secure element; if the amount is less than the offline amount, determining, by the trusted application, an updated offline amount based on the amount; generating, by the trusted application, an interaction response message comprising the amount and a trusted application certificate; signing, by the trusted application, the interaction response message using a trusted application private key; and providing the interaction response message to the second device.

The network interface 206 may include an interface that can allow the first device 200 to communicate with external computers. The network interface 206 may enable the first device 200 to communicate data to and from another device (e.g., a second device, a server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The trusted execution environment 210 can be included on the first device 200. The trusted execution environment 210 can be located within any suitable secure hardware element included in the first device 200. In some embodiments, the trusted execution environment 210 can be a secure software module in the first device 200. In some embodiments, the trusted execution environment 210 can be located partially within a secure element and partially outside of the secure element, where each portion provides different capabilities. The trusted execution environment 210 is further described in reference to FIG. 3.

D. Trusted Execution Environment

A trusted execution environment can be a hardware-assisted execution environment within a system with its own resources (e.g., memory, registers, peripherals, and its own software stack, such as OS, applications etc.). The resources of the trusted execution environment as well as the processes running within the trusted execution environment cannot be accessed by the rest of the system directly.

Figure 3:
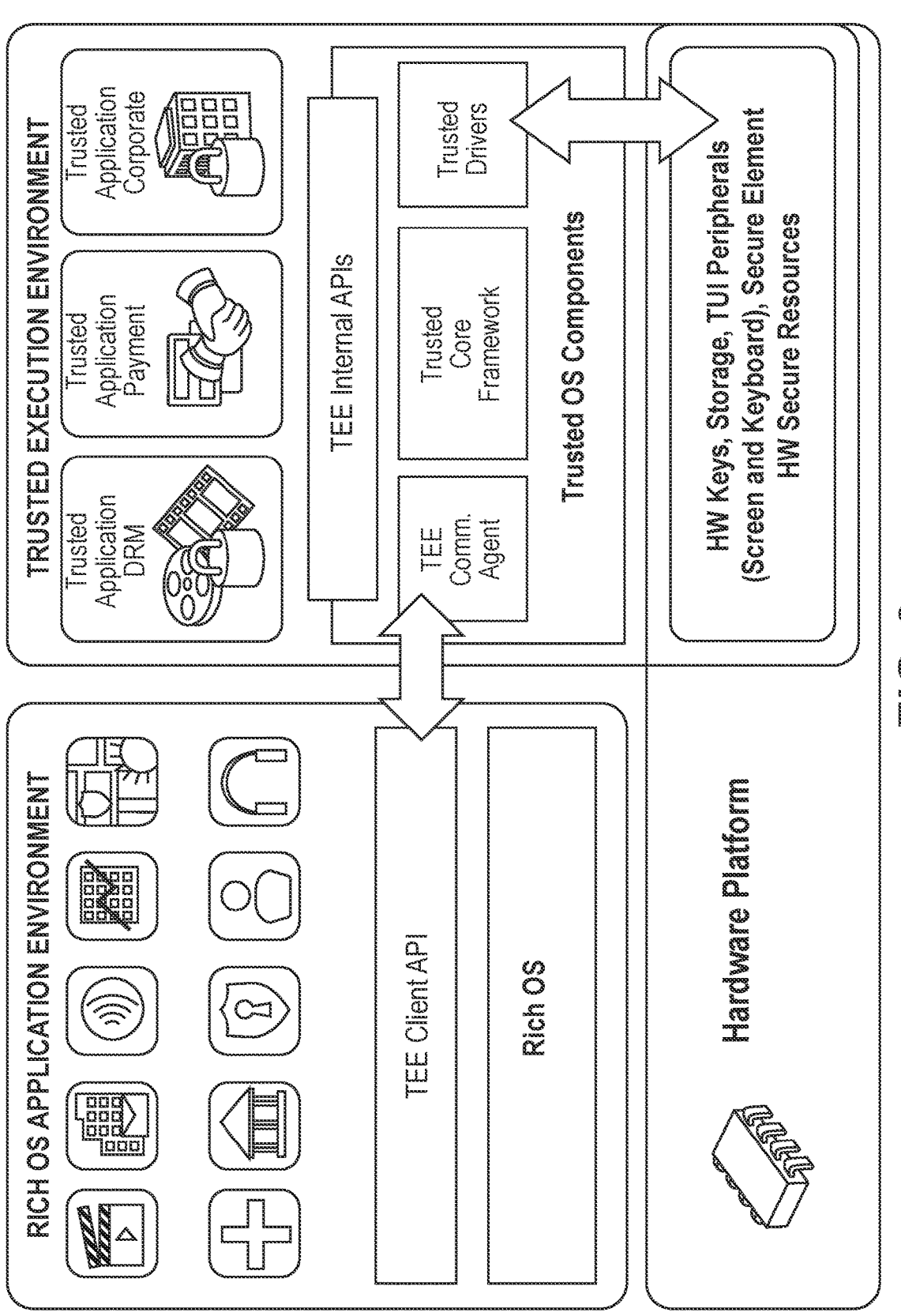
FIG. 3 illustrates an overview of a device that hosts a trusted execution environment according to embodiments.

FIG. 3 illustrates an overview of a user device that hosts a trusted execution environment. The resources of the system are split into two execution environments via hardware means: a rich operating system execution environment (REE) and a trusted execution environment (TEE). The trusted execution environment has its own dedicated memory, registers etc. along with its own trusted operating system. On top of the trusted operating system, third-party trusted applications can be built by making use of trusted execution environment internal APIs. Similarly, a client application can be built on top of the rich operating system. Applications running in the trusted execution environment can access the resources of the rich operating system execution environment, but application running in the rich operating system execution environment cannot access the resources of the trusted execution environment. A client application residing in the rich operating system execution environment can communicate with a trusted application only via the trusted execution environment client APIs if the client application requests the services of the trusted application.

There can be different variations of trusted execution environments depending on the platform upon which they run and/or the hardware used to achieve the isolation in the system. Since various embodiments can be performed on mobile devices, trusted execution environments that run on mobile devices are provided as an example. However, it is noted that embodiments are not limited thereto. For example, the trusted execution environment can use a Trust-Zone architecture (by Arm). The TrustZone architecture achieves the isolation in the system by augmenting computation cores with a mode that allows them to operate only for the trusted execution environment. A physical core is split into two virtual cores with TrustZone: one virtual core operates only for trusted execution environment and the other operates for the rest of the system. To switch from one environment to another, system calls can be used. Applications running within a trusted execution environment may be further isolated from each other by the OS running in trusted execution environment.

Before registering a device which uses trusted execution environment functionalities in the offline interaction system protocol, an original equipment manufacturer (OEM) can attest that the trusted execution environment within a device is set up correctly. Then, embodiments can ensure that the trusted execution environment is provisioned with the right applications. Finally, embodiments can register the instance of a trusted application running in a device if the attestation and the provisioning verifications are successful.

II. Model and Problem Definition

Various embodiments can include a group of devices A, B, C, etc. that can communicate with each other by exchanging messages through a communication network. Every user can be associated with a non-negative numeric value known as an amount (e.g., a balance for the first device can be denoted as $bal_A$) indicating the amount of money possessed by the device. A user can be associated with an offline amount and an online amount. An offline amount can be stored on a secure element on a user device. An online amount can be stored on a server computer or associated database. An interaction (e.g., a payment transaction, a data transfer, etc.) can be represented as a tuple in the form $(A \rightarrow B, x)$ indicating a transfer of x amount from the first device (e.g., a sender device) to the second device (e.g., a receiver device). In some embodiments, an interaction can be a protocol during which the interaction $(A \rightarrow B, x)$ is processed by updating the devices' amounts (e.g., balances) correspondingly (e.g., $bal_A = bal_A - x$ and $bal_B = bal_B + x$). An interaction can be authentic if the sender's amount at the time of interaction is greater than or equal to x.

An interaction system P can include of a network of clients who can verify the authenticity of any interaction within the system P through a designated authority (e.g., referred to as the server computer S). An offline interaction system can provide a mechanism that further enables any pair of clients to interaction with each other while both are disconnected (e.g., offline) from the server computer S. For example, a client A is associated with an online amount, denoted by $onBal_A$, and an offline amount, denoted by $offBal_A$. Given an interaction $(A \rightarrow B, x)$, an online interaction is a protocol that ensures $onBal_A = onBal_A - x$ and $onBal_B = onBal_B + x$. Given an interaction $(A \rightarrow B, x)$, an offline interaction is a protocol that ensures $offBal_A = offBal_A - x$ and $offBal_B = offBal_B + x$.

The offline interaction system according to various embodiments can provide for the properties of offline verifiability, absolute finality, redeemability, and offline transitivity. The offline verifiability property can indicate that the receiver device is able to independently verify the authenticity of any interaction without communicating with the server during the interaction. The absolute finality property can indicate that once an interaction is complete, the receiver is instantly guaranteed to own the transferred funds. The redeemability property can indicate that a client A is able to convert any amount $y \leq offBal_A$ from their offline amount into their online amount (e.g., $offBal_A = offBal_A - y$ and $offBal_A = offBal_A + y$, which are executed atomically), and vice versa. The offline transitivity property can indicate that a device can spend the funds that the device receives offline without requiring a connection to the server.

Various embodiments can assume that a client attempting to perform an interaction (e.g., send a payment) has access to a secure element/hardware to store digital amounts and secure data as well as to execute trusted application programs securely. The trusted application program can be an isolated region of memory, containing both code and data, protected by a trusted execution environment. A device may need to have access to a trusted execution environment to be a sender device during an offline interaction. Otherwise if a device is a receiving device during an offline interaction, then no access to a trusted execution environment and/or a secure element is required.

For a threat model according to various embodiments, let A denote a computational security parameter. Embodiments can assume that all parties communicate with each other via secure and authenticated communication channels. Embodiments consider a probabilistic, polynomial-time adversary who can corrupt any client in order to (1) prevent the protocol from achieving its defined properties; and (2) counterfeit money, for example, by double-spending the client's money or forging new money. A corrupt client may do so by arbitrarily tampering with and/or blocking messages exchanged between the server and the client's trusted execution environment. Embodiments assume that uncorrupt clients employ standard authentication mechanisms such as password, PIN, and biometrics to prevent unauthorized access to their device in order to spend and/or erase their money without their approval. Various embodiments can assume that the server is fully trusted.

III. Trusted Execution Environments

A trusted execution environment (TEE) can be a software stack stored on a read-only memory. In some embodiments, the trusted execution environment can be included within a secure element. The trusted execution environment software stack can include of a set of resources to access the secure element, a trusted operating system (TOS) that provides a developer access to the underlying secure element, and one or more trusted applications (TA) that implement application-specific functionalities within the trusted application environment. The trusted execution environment can offer an execution space that provides a higher level of security for trusted applications running on the device than a rich operating system and more functionality than a secure element alone.

A. Remote Attestation

In remote attestation, a remote party can attempt to ensure that the trusted execution environment within a device is set up correctly. This can be ensured by a read-only memory (ROM) and a device specific device key pair. Both the ROM and the device keys can be embedded to the hardware of the device by the original equipment manufacturer.

A read-only memory can be a root-of-trust and a starting point for a secure boot process. For example, the ROM contains the binary of the program which initiates the booting process, and this binary contains the verification key for the next component that comes in the booting process. Upon powering the device, the CPU reads and executes the initializing program from the ROM, which verifies and loads the next component of the booting process (e.g., the next component verifies the next component and so on until the entire trusted execution environment software stack is loaded). If any of the signature checks fail, booting process halts. Otherwise, the trusted execution environment stack loads correctly (e.g., any software running within trusted execution environment is not modified after the original equipment manufacturer has shipped the device).

At the end of this process, trusted operating system can provide a signature on the loaded binaries to a remote party along with the verification device key. Then, the remote party can present the signature along with the key to the original equipment manufacturer. Since the original equipment manufacturer knows the contents of the trusted execution environment stack, it can verify the signature, and hence attest the correctness of the secure boot process via an internal check.

B. Trusted Application Provisioning

After performing remote attestation of the device, a trusted application can be provisioned to the device. In this context, provisioning can include loading up one or more trusted application trusted applications for the trusted execution environment included in the device. In some embodiments, there are two ways of performing secure provisioning: (1) local provisioning by the original equipment manufacturer, and (2) remote provisioning by remote parties.

In local provisioning, the original equipment manufacturer can load trusted application binaries to the device as part of the trusted execution environment software stack. Then, these trusted applications are loaded during the secure boot process, and thus, their authenticity is ensured by the secure boot process. In remote provisioning, a remote party wants to load a trusted application to a trusted execution environment remotely after the trusted execution environment has been set up. To do so, the remote party first establishes a secure channel with the trusted execution environment (e.g., by using the verification device key), and then transmits the binary of the trusted application. Upon receiving the binary, the trusted execution environment sets up the trusted application. Further, to report that the trusted application is set up correctly, the trusted execution environment can sign the hash of binary with the device secret key and return the signature to the remote party.

In some embodiments, the original equipment manufacturer may restrict remote provisioning only to a set of approved developers. In this case, the original equipment manufacturer can place the verification keys of these developers either into the trusted execution environment software stack or can transmit these keys at a later point in time to the device. Then, whenever a remote party transmits a program (e.g., a trusted application), the remote party can provide a signature on its hash. In such a scenario, the trusted execution environment loads the trusted application only if the signature belongs to one of the approved developers.

C. Authenticity of Trusted Application Computations

During the course of the offline interaction system protocol, the server requires a trusted application to do computations and receives the resulting outputs. Due to that, the problem of verifying authenticity of trusted application outputs as a remote party will be discussed and evaluated. Having the trusted application sign its outputs with the device secret key may not work as there could be multiple trusted applications residing within a trusted execution environment, and hence sharing the device secret key. Therefore, embodiments can utilize a specific key-pair for the trusted application. Methods for establishing such a key-pair will be described.

First, in case of local provisioning, in which the device is shipped with the trusted application binary, the original equipment manufacturer can also embed the OIS key-pair to the secure storage and make the verification portion public. In this case, the original equipment manufacturer can also configure the trusted operating system in a way such that no other trusted application can access this secret key. However, this requires prolonged trust in the original equipment manufacturer. If, for example, the original equipment manufacturer is compromised, it would be able to forge signatures on behalf of the trusted application.

A better approach includes the trusted application generating its own key-pair after it starts to run. In this case, the problem becomes transmitting the verification part to the remote party securely. Embodiments can solve a technical problem of "how can the remote party be ensured the verification key actually belongs to the trusted application running in a correct trusted application environment." A solution to this technical problem, according to various embodiments, is to have the trusted operating system verify the verification key of the trusted application with the device secret key. For example, the trusted application has a method named init which initializes the trusted application in the device by setting up some variables, generating a key-pair and returning the verification key (see Protocol 5). Therefore, the task of the trusted operating system is to prove that the verification key is the output of the init method of the trusted application.

Then, the flow of authenticating the trusted application verification key is as follows, 1. The trusted application generates a key-pair by running the init method.
2. The trusted application returns the generated verification key to the trusted operating system for authentication.
3. The trusted operating system generates a signature on the verification key and on a statement that says that the verification key is generated by the init method of the trusted application.

In further detail, let $\Pi$, $\Pi_T$ denote the trusted execution environment software stack and binary of trusted application, respectively. Further, let $T_A$ denote the instance of trusted application running in A's device. Then, the above steps correspond to, 1. $T_A.\text{vk} \leftarrow T_A.\text{Init}(\ )$
2. $T_A$ invokes $\text{TOS.Authenticate}(T_A.\text{vk}, \text{Init})$.
3. $\text{TOS.Authenticate}(T_A.\text{vk}, \text{Init})$ performs the following method:
   a) if $T_A.\text{vk}$ does not belong to $T_A$, then abort;
   b) Return $\sigma_{D_A, T_A}$ where $\sigma_{D_A, T_A} \leftarrow \text{Sign}([T_A.\text{vk}, \text{Hash}(\Pi, \Pi_T, \text{Init})], D_A.\text{sk})$ As short-hand notation, embodiments use $(T_A.\text{VK}, \sigma_{T_A}) \leftarrow T_A.\text{Init}(\ )$ (see Protocol 4) which indicates a device authenticated output of the Init method. After establishing a key pair with a remote party, the trusted application can guarantee authenticity on its outputs by providing a signature with $T_A$.sk, or by establishing a secure session with the remote party if they are going to exchange a plurality of messages.

D. Trusted Application Registration

After the trusted execution environment is validated and the trusted application (see Protocol 5) is set up via a provisioning phase, the client's device and the trusted application instance can be registered with the server before the client can perform interactions. To do this, the trusted application can first generate a signing key pair, then transmit the verification key to the server who certifies this key by signing it with the server's secret key and returns it to the device. The signed verification key can be in a certificate showing that the trusted application key is generated by a genuine trusted execution environment and is registered with the server. Whenever this device performs an interaction, the device transmits the certificate along with other interaction information, so that the receiver can independently verify the validity of the interaction using the server's public (verification) key.

Figure 4:
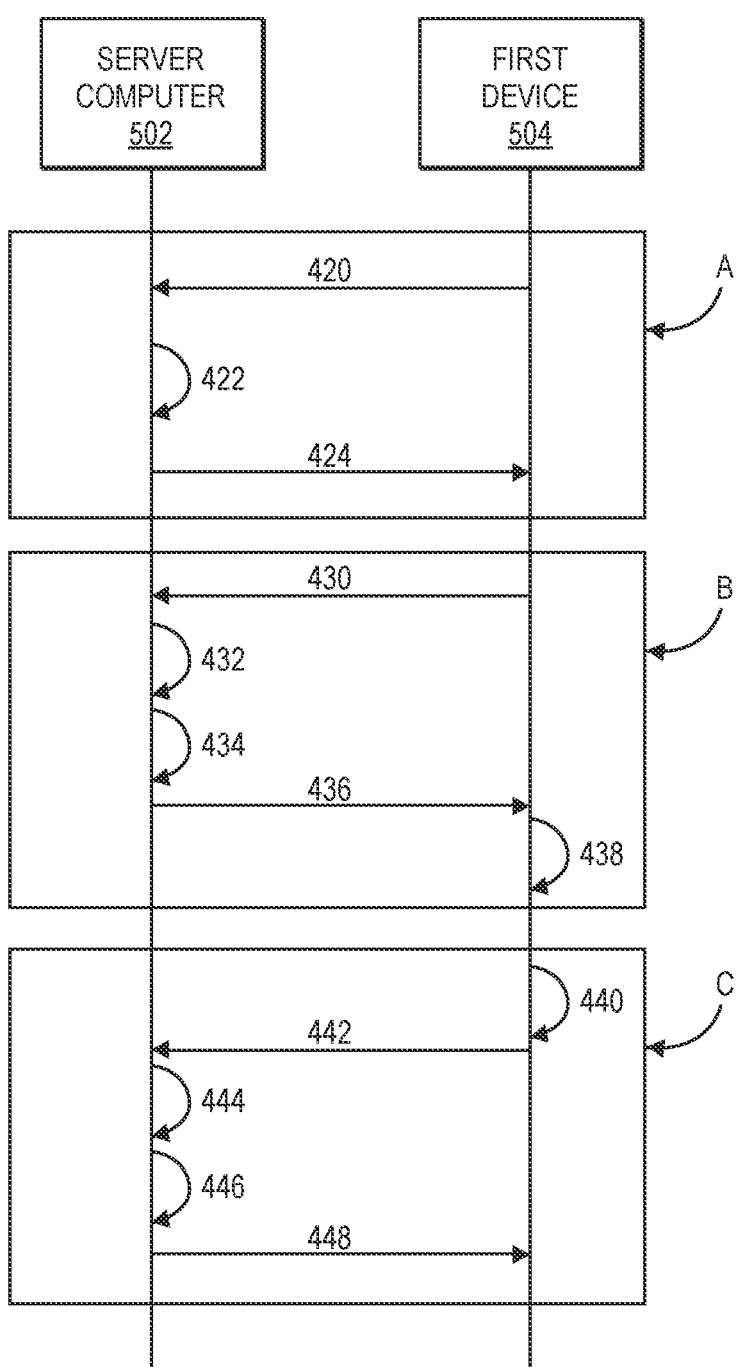
FIG. 4 shows a pre-interaction processing method according to embodiments.

A provisioning method according to various embodiments can be described in respect to FIG. 4. The method illustrated in FIG. 4 will be described in the context of a first user requesting certificates for performing offline interactions from a server computer.

At step 420, during a provisioning process A, the first device 504 can provide a first device public key to the server computer 502 to request a certificate. Further, the first device 504 can provide a trusted application (TA) public key to the server computer 502 to request a certificate.

At step 422, after receiving the first device public key, the server computer 502 can sign the first device public key with a server secret key to form a first device certificate. The server computer 502 can sign the trusted application public key with a server secret key to form a trusted application certificate.

At step 424, the server computer 502 can then provide the certificate (e.g., a first device certificate) to the first device 504. The server computer 502 can then provide the trusted application certificate to the first device 504. In some embodiments, the first device 504 can provide the first device public key and the trusted application public key to the server computer 502 in one message and receive one response including the first device certificate and the trusted application certificate.

Similarly, during provisioning for a second device 506 (not shown in FIG. 4, but see FIG. 5), the second device 506 can provide a second device public key to the server computer 502. The server computer 502 can then sign the second device public key with the server secret key to form a certificate. The server computer 502 can then provide the certificate (e.g., a second device certificate) to the second device 506.

E. Trusted Execution Environment Internal APIS

The trusted application according to embodiments of the invention can include a trusted storage API, a cryptographic API, a time API, and an arithmetic API. The trusted storage API can provide secure storage capabilities to trusted applications for general purpose data as well as cryptographic keys. For example, using the trusted storage API, trusted applications can log data whose integrity and authenticity are guaranteed. The trusted storage API also provides isolation between the storage of trusted applications. The cryptographic API provides an API for cryptographic functionalities that includes key-generation (symmetric and non-symmetric), symmetric and non-symmetric encryption, digest generation and key-exchange. The time API provides an API for timing operations. A trusted application can either keep its internal timer with arbitrary initialization or can simply sync it at some point with an external trusted source of time. The arithmetic API provides an API for working on large numbers and prime fields. The arithmetic API can be provided to help a developer to expand upon the cryptographic API.

Table 1 below describes certain terminology that is used in embodiments.

TABLE 1

Summary of Trusted Execution Environment Terminology

Secure Device (D): The hardware components that may be used to implement a trusted execution environment (e.g., Arm TrustZone architecture).
Original Equipment Manufacturer (M): An entity that sets up the hardware of a device.
Attestation: Verifying that a TEE within a device is set up correctly by authentic hardware.
Provisioning: Ensuring a desired set of applications is loaded correctly within a TEE.
Trusted Execution Environment (TEE): A hardware-isolated execution environment within the system. A TEE can have a dedicated operating system, a trusted operating system (TOS), and a dedicated memory region (e.g., a trusted memory) that is only accessible to the processes running within TEE.
Rich Execution Environment (REE): An execution environment that exists beside TEE. An REE can have its own operating systems, a rich OS (ROS), and it can access the memory regions except what is allocated to the TEE, whereas a TEE may access any region.
Trusted OS (TOS): An operating system running within the TEE. Typically, a TOS comes with a relatively small-code base and can be assumed to be free of software bugs/vulnerabilities.
Rich OS (ROS): An operating system running within the REE. In contrast to a TEE, an REE has a large code base and may contain bugs, security vulnerabilities, etc.
Trusted Application (TA): An application that is running within the TEE. In various embodiments it can be assumed that the TOS is rich enough to realize the trusted application specified herein.
Client Application (CA): An application that is running within the REE. A client application can communicate with a trusted application by calling a trusted application API through the trusted operating system.

IV. Offline Interaction Processing Methods

A. User Device Setup

Every user device (TEE-enabled or not) can participate in a one-time, setup protocol to register the device with the server (e.g., establish cryptographic keys and certificates) and to initialize the device's trusted execution environment stack in case of a trusted execution environment enabled device.

During user device registration, the user device can generate a local signing key pair and submits the verification key to the server. In return, the server initializes the client's account information and returns a certificate to the user device. The certificate can be a signature by the server on the client's verification key so that the user device can later prove to other entities that the user device is registered with the server.

B. Trusted Application Registration

The trusted application on a user device can be registered (e.g., with the server computer). As described herein, this may utilize the original equipment manufacturer to attest whether the trusted execution environment that runs the trusted application instance is authentic or not. According to some embodiments, the original equipment manufacturer ships the user devices with the trusted application binary (e.g., locally provisioned device). In some embodiments, one user device can run one trusted application during an offline interaction.

Table 2 below describes certain protocol notations.

TABLE 2

| Protocol Notations | |
|---|---|
| Description | |
| Variable | |
| S.clientRegistry | Server S's registry of valid certificates |
| S.TARegistry | Server S's registry of valid trusted applications |
| S.onBal$_A$ | Client A's online amount stored at S |
| S.i$_A$ (e.g., a counter value) | Client A's index maintained by S |
| D$_A$ | Client A's secure element/hardware |
| T$_A$ | Client A's trusted application deployed on D$_A$ |
| (sk$_S$, vk$_S$) | Server S's signing key pair (private key, public key). Also referred to as (secret key, verification key). |
| (sk$_A$, vk$_A$) | Client A's signing key pair (private key, public key). Also referred to as (secret key, verification key). |
| (T$_A$.sk, T$_A$.vk) | T$_A$'s signing key pair |
| cert$_A$ | Certificate for client A consisting of vk$_A$ and a signature on it by S certifying that vkA was issued by S |
| T$_A$.cert | Certificate for trusted application consisting of T$_A$.vk and a signature on it by S certifying that T$_A$.vk was issued by S |
| T$_A$.j (e.g., a counter value) | Client A's index maintained by T$_A$ |
| T$_A$.log | List of offline interactions received by T$_A$ |
| P.amount | Amount money transferred by interaction response message P |
| P.senderCert | Certificate of the sender of interaction response message P |
| P.receiverCert | Certificate/key of the receiver of interaction response message P |
| P.index | Index of interaction response message P |
| P.time | Time when interaction response message P was created |
| Function | |
| H(x) | Outputs a cryptographic hash of x |
| Sign(x, sk) | Outputs a signature of x signed with signing key sk |
| SigVerify(x, σ, vk) | Outputs 1 if signature σ over x using verification key vk is valid |
| CertVerify(cert) | Outputs 1 if $\mathrm{SigVerify(cert.vk, cert.sig, vk}_S) \overset{?}{=} 1$ |
| TACertVerify(cert, vk$_S$) | Outputs 1 if $\mathrm{SigVerify([cert.vk, "OIS"], cert.sig, vk}_S) \overset{?}{=} 1$ |
| OEMVerify(vk, cert, M, vk$_M$) | Outputs 1 if $\mathrm{SigVerify([vk, "Secure element"IM], cert, vk}_M) \overset{?}{=} 1$ |
| T$_A$.Deposit(x, . . .) | Deposits x amount of money into client A's secure hardware T$_A$ |
| T$_A$.Withdraw(x, . . .) | Withdraws x amount of money from client A's secure hardware T$_A$ |
| T$_A$.Pay(x, . . .) | Debits x amount of money from trusted application and outputs an interaction response message P |
| T$_A$.Collect(P) | Credits an interaction response message P into T$_A$'s amount |

In some embodiments, during trusted application registration, the server initializes a counter for each offline interaction system instance, denoted by is in Protocol 4. The trusted application can maintain an internal variable (e.g., a counter or index) (see. T.i in Protocol 5), which is kept in sync with the server computers variable (e.g., a counter or index). Together, the counter or index prevent double spending both on the server computer side and on the client side (e.g., user device side).

Protocol 3 shows a client setup protocol.

---

Protocol 3: Client Setup Protocol

---

A first user device A requests the server computer S to create an account.
1. A sends [ClientRegister, $vk_A$] to S, where $(vk_A, sk_A) \leftarrow$ KeyGen(1λ).
2. Upon receiving [ClientRegister, $vk_A$], S performs the following steps:
  a) Abort if $vk_A \in$ S.clientRegistry;
  b) Add $vk_A$ to S.clientRegistry;
  c) S.onBal$_A \leftarrow 0$;
  d) Create cert$_A$ such that cert$_A$.vk $\leftarrow vk_A$ and cert$_A$.sig $\leftarrow$ Sign($vk_A$, $sk_S$);
  e) Send cert$_A$ to A.

---

C. Trusted Application Program

The methods provided by the trusted application can be provided to the client applications. The trusted application maintains some variables whose functions are as follows.

The variable T.bal is an offline amount (e.g., an offline balance) that is maintained within the user device.

The variable T.log is a log of interaction received from other users. The interaction log can be used to prevent a user from replaying a received interaction multiple times to increment an offline amount.

The variable T.i is a counter that is synchronized between the server and the user device. The counter can be used to prevent double-spending attacks. Further, the counter T.i can make each interaction unique, such that whenever a user device receives an interaction, the user device can determine whether or not the sender device is replaying a previous interaction (e.g., if an interaction with the same counter has already been received).

Protocol 4 shows a trusted application registration protocol.

---

Protocol 4: Trusted Application Registration Protocol

---

The first user device A requests the server computer S to enroll the instance of the trusted application, denoted $T_A$, on the secure element $D_A$. After the secure boot establishes a TEE, the following method can be performed, where σ is a signature:

1. A obtains $(T_A.vk, \sigma_{D_A}, T_A) \stackrel{?}{=} T_A.Init( )$ and sends [TARegister, $D_A.vk$, $T_A.vk$, $vk_A$, $\sigma_{D_A}$, $T_A$] to S.
2. Upon receiving [TARegister, $D_A.vk$, $T_A.vk$, $vk_A$, $\sigma_{D_A}$, $T_A$] from A, S does the following steps:
  a) Abort if any of the following happens.
    i. $vk_A <$S.clientRegistry;
    ii. $T_A.vk \in$ S.TARegistry;
    iii. OEMVerify($T_A.vk$, $\sigma_{D_A}$, $T_A$ , $D_A.vk$) i≠ 1;
  b) Add TA.vk to S.TARegistry and initialize iA $\leftarrow 0$;
  c) Create a certificate cert such that
    cert.vk $\leftarrow$ TA.vk;
    cert.sig $\leftarrow$ Sign([TA.vk, "Trusted OIS Application"], skS).
  d) Send [cert] to A;
3. Upon receiving [cert] from S, device A invokes $T_A$.CertInit(cert)

---

Protocol 5 shows a trusted application initial process.

---

Protocol 5: Trusted Application

---

Init( ):
    1. (T.vk, T.sk) ← KeyGen($1^\lambda$); T.bal ← 0; T.cert = 0; T.log ← 0; T.i ← 0; T.j
    ← 0;
    2. Output T.vk.
CertInit(cert):
      1. Abort if TACertVerify(cert, T.vk$_S$) ≠ 1.
      2. T.cert ← cert.
Deposit(x, i, σ$_S$):
    1. Abort if T.cert = 0 or i ≠ T.i + 1 or SignVerify([T.vk, x, i], σ$_S$, vk$_S$) ≠ 1;
    2. T.bal ← T.bal + x ;
    3.  T.i ← T.i + 1.
Withdraw(x):
    1. Abort if T.cert = 0 or x > T.bal;
    2.T.bal = T.bal − x ;
    3. T.i = T.i + 1;
    4. Output [x, T.i, σ], where σ = Sign([x, T.i], T.sk).
Pay(x, receiverCert):
    1.Abort if T.cert = 0 or T.bal < x;
    2.T.bal ← T.bal − x ;
    3. T.j ← T.j + 1;
    4. P.amount ← x ; P.senderCert ← T.cert; P.receiverCert ← receiverCert;
    P.index ← T.j;
    5.Output P, where P.sig ← Sign([P.amount, P.senderCert, P.receiverCert,
    P.index], T.sk).
Collect(P):
      1. Abort if T.cert = 0 or PayVerify(P, T.cert) ≠ 1 or P ∈ T.log;
      2. T.bal ← T.bal + P.amount;
      3. Append P to T.log.
Get-Amount( ):
      Output if T.cert = 0 or [T.bal, T.i, σ], where σ = Sign([T.bal, T.i], T.sk).

---

Protocol 6 shows an interaction verification function.

---

Protocol 6: Interaction Verification Function

---

PayVerify(P, receiverCert):
Return 1 if all of the following conditions hold:
    1. P.receiverCert $\overset{?}{=}$ receiverCert,
    2. TACertVerify(P.senderCert) $\overset{?}{=}$ 1, and
    3. SigVerify([P.amount, P.senderCert, P.receiverCert, P.index], P.sig,
P.senderCert.vk) $\overset{?}{=}$ 1.

---

D. Deposit and Withdraw Amounts

During a deposit method, a first device (e.g., a user device) can deduct an amount (e.g., a selected amount) from an online amount associated with the first device, as maintained by the server, and deposits the amount to an offline amount which is maintained by the trusted application within the first device (see Protocol 7). The withdraw protocol works in a similar manner to the deposit protocol, however, the amount is provided in the opposite direction. For example, for the withdraw protocol, the first device withdraws some amount from the offline amount and transfers it to the server to add the amount to the online amount (see Protocol 8).

Referring to FIG. 4, FIG. 4 shows a deposit funds method B according to embodiments. FIG. 4 illustrates the first device 504 requesting to receive an offline amount from the server computer 502.

For example, at step 430, the first device 504 can provide a request including at least an amount x. The first device 504 can also provide the trusted application public key to the server computer 502.

At step 432, the server computer 502 can determine whether or not the amount x exceeds an online amount. If the amount x exceeds the online amount, then the server computer 502 can terminate the process. If the amount x does not exceed the online amount, then the server computer 502 can set an updated online amount equal to the difference of the online amount and the amount x (e.g., online amount—x). In some embodiments, the server computer 502 can also update an integer value that is a counter value (also referred to as an index value i). The counter value can increase by 1 (or other predetermined amount) each time the server computer 502 and the first device 504 communicate in order to prevent replay attacks.

At step 434, the server computer 502 can generate and sign a response message comprising an indication that the deposit is confirmed (e.g., "depostconfirmed"), the amount x, the index value i generated by the server (e.g., S.i$_A$), and the signature a. The server computer 502 can generate the signature for the response message by signing the data in the response message with a server computer private key. For example, the server computer 502 can obtain the digital signature a by computing Sign([T$_A$.vk,x, S.i$_A$], S.sk$_S$).

At step 436, after generating and signing the response message, the server computer 502 sends the response message with the amount to be added to the offline amount within the trusted application on the secure element in the first device 504.

At step 438, after receiving the response message, the first device 504 can then provide the received message to the trusted application. For example, the trusted application can verify the signature using a server computer public key associated with the server computer private key. The trusted application can also update an offline amount by adding the amount to a previous offline amount. In some embodiments the trusted application can increase the counter value by 1 (see Protocol 7).

FIG. 4 also shows a withdraw offline amount method C according to embodiments. In some embodiments, the withdraw offline amount method can be similar to the deposit offline amount method. However, rather than depositing an amount into the offline amount of the trusted application, an amount is withdrawn from the offline amount of the trusted application and provided to the server computer 502 (see Protocol 8). In some embodiments, a user of the first device 504 can select to transfer a portion or all of an offline amount to an online amount maintained by the server computer 502.

For example, after receiving user input to initiate a withdraw method C, at step 440, the first device 504 can determine whether or not an offline amount is greater than or equal to a selected amount to transfer to the online amount. For example, the user can select to transfer $5 from the offline amount to the online amount. The first device 504, in particular the trusted application, can determine if the offline amount is greater than or equal to $5. If the offline amount is less than the selected amount, then the first device 504 can terminate the method and notify the user of the determination. If the offline amount is greater than or equal to (e.g., exceeds) the offline amount, then the first device 504 can proceed with the withdraw method C at step 442.

At step 442, the first device 504 can provide a withdraw request message to the server computer 502. The withdraw request message can include the amount (e.g., the amount to transfer), an index maintained by both the first device 504 and the server computer 502 locally, and a digital signature. For example, the trusted application can perform $T_A$.Withdraw(x) (see Table 1). The trusted application can generate the digital signature in any suitable manner. For example, the trusted application can sign the message with a trusted application private key. The trusted application private key can correspond to a trusted application public key for which the server computer 502 previously issued a trusted application certificate.

At step 444, after receiving the withdraw request message, the server computer 502 can determine whether or not the withdraw request message is valid. For example, the server computer 502 can determine that the withdraw request message is valid if the index value provide in the withdraw request message matches an index value maintained by the server computer 502.

The server computer 502 can determine that the withdraw request message is valid if the digital signature on the withdraw request message is valid. For example, the server computer 502 can verify the signature using SigVerify([x,i], $\sigma$, $T_A$.vk)≠1 as indicated in Protocol 8. In other words, the server computer 502 can verify the signature using the trusted application public key associated with the trusted application private key used to create the signature.

After determining that the withdraw request message is valid, the server computer 502 can update the online balance to include the amount as indicated in the withdraw request message (e.g., the amount is withdrawn from the secure element and provided to the server computer 502). For example, the server computer 502 can perform S.on-Bal$_A$←S.onBal$_A$+x.

In some embodiments, the server computer 502 can increment the index by a predetermined amount (e.g., by 1). The first device 504 can also increment the index by the same predetermined amount locally after receiving the withdraw response message at step 448, below.

At step 446, the server computer 502 can generate a withdraw response message comprising an indication of whether or not the withdraw is confirmed. For example, if any of the above verifications fail, then the server computer 502 can generate a withdraw response message comprising an indication that the withdraw is not confirmed (e.g., "withdrawdenied"). If the above verifications pass, then the server computer 502 can generate a withdraw response message comprising an indication that the withdraw is confirmed (e.g., withdrawconfirmed").

At step 448, after generating the withdraw response message, the server computer 502 can send the withdraw response message comprising the indication of whether or not the withdraw is confirmed to the first device 504.

Protocol 7 shows a deposit protocol.

---
Protocol 7: Deposit Protocol (Online-to-Offline)
---

Deposit Protocol (Online Amount ⇒ Offline Amount)
A first device A requests the server computer S to deposit an amount of x (e.g., funds) from an online amount stored at S into the offline amount stored within the trusted application $T_A$.
  1. A sends [Deposit, x] to S.
  2. Upon receiving [Deposit, x] from A, server S performs the following method:
    a) Abort if x > S.onBal$_A$;
    b) S.onBal$_A$ ← S.onBal$_A$ − X;
    c) S.i$_A$ ← S.i$_A$ + 1;
    d) Send [DepositConfirmed, x, S.i$_A$, $\sigma$] to A, where $\sigma$ ← Sign([$T_A$.vk, x, S.i$_A$], S.sk$_S$).
  3. Upon receiving [DepositConfirmed, x, i, $\sigma$] from S, device A invokes T.Deposit(x, i, $\sigma$).

---

Protocol 8 shows a withdrawal protocol.

---
Protocol 8: Withdraw Protocol (Offline-to-Online)
---

Withdraw Protocol (Offline Amount ⇒ OnlineAmount)
A first device A requests the server computer S to withdraw an amount of x (e.g., funds) from an offline amount stored within the trusted application $T_A$ into the online amount maintained by S.

-continued

---
Protocol 8: Withdraw Protocol (Offline-to-Online)
---

1. A sends [Withdraw, x,i , σ] to S, where [x,i , σ] ←$T_A$.Withdraw(x).
2. Upon receiving [Withdraw, x,i , σ] from A, server S performs the following method:
    a) Abort if i ≠ $S.i_A$ or SigVerify([x,i], σ, $T_A$.vk) ≠ 1;
    b) $S.onBal_A$ ← $S.onBal_A$ + x;
    c) $S.i_A$ ← $S.i_A$ + 1;
    d) Send [WithdrawConfirmed] to A.

---

E. Offline Interaction Messaging

Protocol 9 below shows an offline interaction protocol, which is further described with respect to FIG. 5.

---
Protocol 9: Offline Interaction Protocol
---

Offline Payment Protocol
Client B requests client A to send him x amount while both are offline from S.
    1. If B ∈ S.TARegistry, then it sets receiverCert ← $T_B$.cert. Otherwise,
        receiverCert ← $cert_B$. Then, B sends [RequestPayment, receiverCert] to
        A.
    2. Upon receiving [RequestPayment, receiverCert] from B, client A sends P ←
        $T_A$.Pay(x, receiverCert) to B.
    3. Upon receiving P from A, client B aborts if PayVerify(P, receiverCert) ≠ 1 or
        P ∈ B.log.
    4. B adds P to B.log and sends [ReceivedPayment] to A.

---

Figure 5:
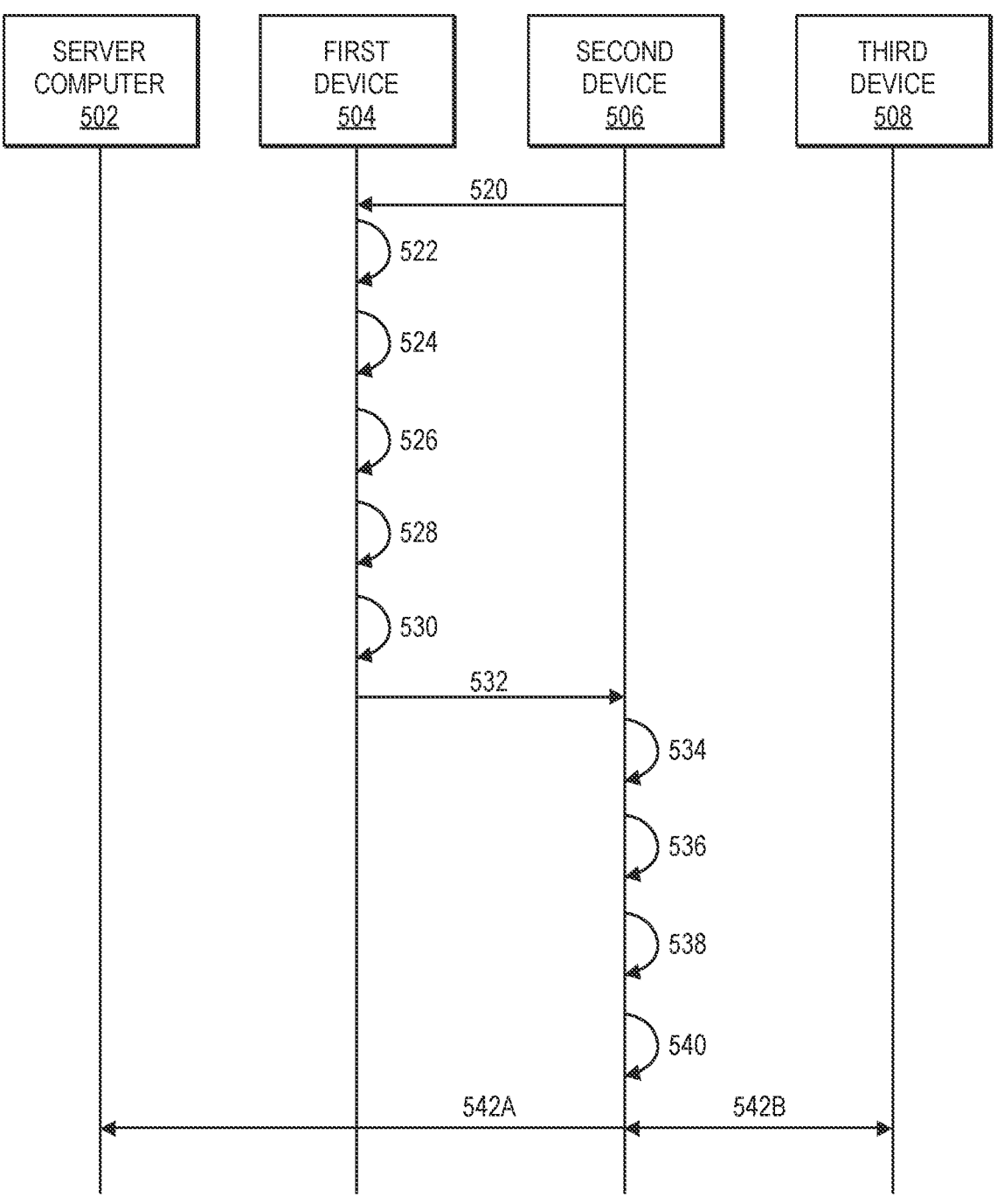
FIG. 5 shows an interaction processing method according to embodiments.

FIG. 5 shows an offline interaction processing method according to embodiments. The first device 504 can perform an offline interaction with the second device 506 without communications with the server computer 502.

At step 520, the second device 506 can request an amount from the first device 504 during an interaction. The second device 506 can transmit a second device certificate and an amount to the first device 504. For example, prior to step 520, the second device 506 can generate an interaction request message comprising the second device certificate and the amount to the first device 504. The interaction between the first user of the first device 504 and the second user of the second device 506 can be a transaction, where the first user is a user and the second user is a resource provider. The amount can be a determined and agreed upon amount. For example, the amount can be determined based on a number of resources selected by the first user and brought to a check stand (or other suitable resource provider location) for purchase.

At step 522, upon receiving the interaction request message, the first device 504 and/or a trusted application in the first device 504 can verify the second device certificate. For example, the first device 504 can verify the second device certificate using a server computer public key stored at the first device 504 and/or the trusted application. For example, the trusted application can verify the second device certificate within a trusted execution environment.

At step 524, after verifying that the second device certificate received from the second device 506 is valid, the trusted application in a secure element of the first device 504 can determine whether or not the amount as indicated in the interaction request message is less than an offline amount stored in the secure element. For example, the amount in the interaction request message can be $10. The trusted application can determine if the offline amount is greater than or equal to the amount. For example, the offline amount can be $22. In such a case, the trusted application can determine that the offline amount ($22) is greater than the amount in the interaction request message ($10). If the amount in the interaction request message is greater than the offline amount, then the trusted application can terminate the interaction. In some embodiments, the trusted application and/or the first device 504 can provide an interaction response message to the second device 506 that indicates that the interaction cannot be processed. In some embodiments, the interaction response message can further include an indication why the interaction cannot be processed (e.g., lack of funds, etc.).

At step 526, if the amount is less than the offline amount, the trusted application in the first device 504 can determine an updated offline amount based on the amount. For example, the trusted application can update the offline amount using the amount. The trusted application can determine the updated offline amount to be $12.

In some embodiments, the trusted application can also verify that a counter value (or index value) is a correct value, if the trusted application has communicated with the second device 506 previously (as described above). If this is the first time that the second device 506 and the first device 504 are interacting, then the index value can be 0 (or may start at 1, in some embodiments). The trusted application can increment a locally maintained index value by 1 when sending the interaction response message.

At step 528, after updating the offline amount, the trusted application can then generate an interaction response message (e.g., a payment message). The interaction response message can include the amount (e.g., x), and the second device certificate (e.g., receiverCert). In some embodiments, the interaction response message can include a trusted application certificate (e.g., T.cert). In some embodiments, the interaction response message may further include a first device certificate. The interaction response message can also include a counter value (T.j).

For example, the trusted application can set the following values in the interaction response message P:
    P.amount←x;
    P.senderCert←T.cert;
    P.receiverCert←receiverCert;
    P.index←T.j;

At step 530, after the trusted application generates the interaction response message, the trusted application in the first device 504 can sign the interaction response message using a trusted application private key.

The trusted application can sign the interaction response message P using a trusted application private key associated with the trusted application public key in the trusted application certificate. The trusted application can sign the interaction response message P, as indicated in Protocol 5, by performing: Output P, where P.sig←Sign([P.amount, P.senderCert, P.receiverCert, P.index], T.sk).

At step 532, after digitally signing the interaction response message, the first device 504 sends the interaction response message including the signature (e.g., sigma (a)) to the second device 506.

At step 534, after receiving the interaction response message, the second device 506 can perform a PayVerify process (see Protocol 6). For example, the second device 506 can verify that the received second device certificate is the same as the second device certificate (e.g., determines that the first device 504 did not tamper with the second device certificate).

At step 536, the second device 506 can verify the received trusted application certificate, for example, with a server computer public key.

At step 538, the second device 506 can verify the signature (e.g., sigma) of the interaction response message using the trusted application public key of the trusted application certificate (e.g., corresponding to the trusted application private key used to create the signature).

In some embodiments, at step 540, the second device 506 can temporarily store the interaction response message P. For example, if the second device 506 includes a second secure element, then the second device 506 can store the interaction response message P in the second secure element.

In some embodiments, at step 542A, the second device 506 can provide the interaction response message P to the server computer 502. In other embodiments, at step 542B, the second device 506 can perform a second interaction with a third device 508. Steps 542A and 542B will be described in further detail in the following section.

F. Claim and Collect Amounts

After receiving and verifying an interaction response message P, the second device 506 can add the amount indicated in the interaction response message (e.g., P.amount) to an amount associated with the second user in two different ways (e.g., step 542A or step 542B). In some embodiments, if the second device 506 has a second trusted application running in a second secure element, then the second device 506 can perform a collect method (e.g., $T_B$.Collect(P)) to add the amount to the second offline amount. In other embodiments, if the second device 506 does not have a secure element, then the second device 506 can perform a claim method with the server computer 502 as described in Protocol 10 and add the amount to the second online amount.

At step 542A, during the claim method, the second device 506 can claim an amount provided to the second device 506 from the first device 504 during a previous interaction (e.g., performed during steps 520-540). The second device 506 can provide an offline interaction response message P that was received offline to the server computer 502 when the second device 506 goes online. The second device 506 can provide the interaction response message P to the server computer 502 over any suitable communication channel.

Upon receiving the interaction response message, the server computer 502 can verify both the trusted application certificate and the second device certificate that are included in the interaction response message. The server computer 502 can add the amount included in the message to an online amount associated with the second device 506.

In some embodiments, the server computer 502 can add the message P to an interaction log. For example, the interaction log can include interaction response messages from previous interactions. The server computer 502 can deny the provided interaction response message from the second device 506 if the interaction response message is already included in the interaction log.

After updating the online amount, or declining the interaction response message, the server computer 502 then sends a confirmation or declination response message to the second device 506. For further details see Protocol 10.

---

Protocol 10: Claim Protocol (Offline-to-Online)

---

Claim Protocol (Offline Amount ⇒ Online Amount)

A second device B submits an offline interaction response message P, received from the first device A, to the server computer S to have the amount included into the online amount associated with the second device B stored at the server computer S.

1. B sends [Claim, P] to S.

2. Upon receiving [Claim, P] from B, server S performs the following method:

a) Abort if any of the following is true:

i. $vk_B \notin$ S.clientRegistry;

ii. P.receiverCert.vk $\in$ S.TARegistry;

iii. PayVerify(P, P.receiverCert) $\neq$ 1;

iv. P $\in$ S.log;

b) S.onBal$_B$ ← S.onBal$_B$ + P.amount;

c) Add P to S.log;

d) Send [ClaimConfirmed] to B.

In other embodiments, at step 542B, the second device 506 can perform the collect method. The second device 506 can perform step 542B if the second device 506 includes a second trusted execution environment with a second trusted application. For example, at step 542B, after receiving the interaction response message P, the second device 506 can provide the interaction response message P to the second trusted application of the second device 506. The second trusted application can verify the interaction response message, as described herein. The second trusted application of the second device 506 then adds the amount to a previous second offline amount to obtain an update second offline amount.

After collecting the amount into the offline amount, the second device 506 can perform a second interaction between the second device 506 and the third device 508. The third device 508 can be operated by a third user. The second interaction between the second device 506 (e.g., as a user) and the third device 508 (e.g., as a resource provider) can be similar to the first interaction described above between the first device 504 and the second device 506 during steps 520-540.

For example, the second device 506 can receive a second interaction request message comprising a second amount and a third device certificate during a second interaction from a third device 508. The second device 506 can verify the third device certificate using the server computer public key corresponding to the server private key used to sign the third device certificate. A second trusted application in a second secure element of the second device 506 can determine whether or not the second amount is less than a second offline amount stored in the second secure element. For example, the second offline amount may have previously been updated based on the amount provided in the interaction response message during the first interaction (e.g., received at step 532). If the second amount is less than the second offline amount, the second device 506 can determine a second updated offline amount based on the second amount. The second device 506 can then generate a second interaction response message comprising the second amount and the second device certificate then sign the second interaction response message using a second trusted application private key. The second device 506 can then provide the second interaction response message to the third device 508. The third device 508 can then perform either a claim method or a collect method as described herein.

V. Offline Blockchain Based Interactions

In some embodiments, a smart contract can perform various functionalities herein described as being performed by the server computer. A smart contract is a computer program (e.g., processing software) that is intended to automatically execute, control or document legally relevant events and actions according to the terms of a contract or an agreement. A few advantages of a smart contract is the reduction of need in trusted intermediators, arbitrations and enforcement costs, fraud losses, as well as the reduction of malicious and accidental exceptions.

As described thus far, embodiments have utilized a trusted server S for both provisioning OPS TA and online interactions. In this section, embodiments can separate these two tasks of the server S and can implement the online interaction portion using a smart contract. In some cases, the whole server S is not simply replaced with a smart contract because during provisioning (e.g., as illustrated in protocol 4) process the server S uses its signing key to authorize each OPS TA for offline interactions. Since all information stored in a smart contract is public, it is typically impossible to store signing keys in the contract state. Thus, embodiments adopt a design where the Deposit, Withdraw, and Claim functions are delegated to a smart contract.

Thus, for example, during a claim method (e.g., after a second user device receives an interaction response message from a first user device), the second user device can provide the interaction response message to processing software. The processing software can update a first online amount associated with the first device and a second online amount associated with the second device based on the amount included in the interaction response message.

In some embodiments, the processing software can be a smart contract and can provide a proof of inclusion to the second user device after processing the interaction response message. In other embodiments, the processing software can be included in a server computer (as described in detail herein).

During TA registration (protocol 4), when an OPS TA sends a TARegister to the server S, the server S responds with [cert]. However, when a smart contract is utilized, the server S can also send the OPS TA identity (e.g., the TA verification key) to the smart contract. In addition, the Withdraw and Claim methods can be modified so that the OPS TA can now send the Withdraw and Claim to the smart contract instead of the server S. Since the smart contract has the verification key of the OPS TA, the smart contract can simply verify the Withdraw and Claim to complete the Withdraw and Claim. However, the deposit verification is more a subtle process that is described in further detail in the rest of this section.

During the Deposit protocol, upon receiving the Deposit-Confirmed message from the server S, as described herein, the OPS TA validates the message for correctness using the verification key of the server S and updates its offline balance. Since the smart contract cannot sign messages, embodiments can instead implement blockchain inclusion proofs to convince the OPS TA of any event on the blockchain. Note that these proofs need to convince the OPS TA that the deposit transaction was executed correctly.

One technical problem is that there can be different types of blockchain inclusion proofs that may need to interact with the smart contract and the user device. For example, blockchain inclusion proofs differ based on the underlying architecture of the ledger protocol where the smart contract is hosted. These distributed ledgers can be broadly classified into two categories: 1) Nakamoto consensus and 2) Byzantine fault tolerant (BFT) consensus.

Nakamoto consensus protocols, such as proof-of-work blockchains, typically rely on the longest/heaviest chain to resolve potential forks. In contrast BFT blockchains, such as Algorand and Hotstuff, participating nodes (e.g., participants) typically decide on a block when a group of signers reaches a unanimous vote to include the block in the ledger. This signer group can include either a subset of participants or all of them.

A. Inclusion Proofs Nakamoto Type Consensus

The original Bitcoin paper describes an efficient inclusion proof technique, known as simplified payment verification (SPV), where the proof only includes the header chain instead of the entire ledger. As a result, in Bitcoin, the proof only requires 80 bytes of information per block instead of 1 MB per block.

Although relying only on block headers reduces the verification overhead of inclusion proofs, it still incurs a significant overhead, particularly when considering the fact that this overhead increases linearly with the number of blocks. This has already become a major concern in Ethereum due to its significantly shorter block interval than Bitcoin (15 seconds vs. 10 minutes) and significantly larger block headers (508 bytes vs. 80 bytes).

To reduce this proof size for Nakamoto blockchains, proposals for sublinear light clients were introduced and typically rely on the notion of superblocks, blocks that solve a more difficult PoW puzzle than the current target puzzle. Proofs of proof of work (PoPoW) based on superblocks were introduced and formalized as an interactive proof mechanism. PoPoWs allow a prover to convince a verifier with a high probability in logarithmic time and communication that a chain contains a sufficient amount of work.

To overcome these challenges, Bunz et al. propose Fly-Client [B. Bunz, L. Kiffer, L. Luu, and M. Zamani, "Fly-client: Super-light clients for cryptocurrencies," in 2020 IEEE Symposium on Security and Privacy (SP). IEEE, 2020, pp. 928-946.]. FlyClient requires downloading only a logarithmic number of block headers to verify the validity of the chain. Once the chain is verified, the client needs to store only a single block to efficiently verify the inclusion of any transaction on the blockchain. The FlyClient protocol is a non-interactive PoPoW but overcomes the limitations of the superblock-based NIPoPoW protocol.

Thus, FlyClient and/or other efficient Nakamoto type consensus protocols can be utilized to provide inclusion proofs to a user device from the smart contract when a deposit is successfully added to the blockchain.

B. Inclusion Proofs for BFT Type Consensus

BFT based ledger protocols typically consist of nodes (X) that participate in a consensus protocol to decide on each block individually. In many BFT based ledgers the set X rarely changes and is known a priori. However, in some BFT protocols X can change every block in a verifiable manner.

When it comes to efficient inclusion proofs, we are not aware of any works that address this technical problem of providing efficient inclusion proofs for a deposit for BFT ledgers. A first technical solution will be described where the set of nodes participating in the consensus protocol is fixed.

To generate an inclusion proof, nodes in X participate in a one-time setup protocol for threshold signing-verification key. One such example is the a threshold signature where the verification key (vk) is a public parameter and the signing key (sk) is secret that is shared among all nodes in X. Then after the setup phase, each node in X will receive their share of the secret key. The OPS TA is then initialized with vk. Once the key is established, the inclusion proof for each interaction can be a threshold signature on the block that includes the interaction. Hence, for these blockchains, the OPS TA can validate the inclusion of the Deposit message by validating a single signature. Also, the size of such inclusion proof is at most the size of the block that includes the transaction, which can further be reduced by using techniques such as Merkle trees.

In some embodiments, a threshold signature may not be necessary, and embodiments can use standard signatures where the inclusion proof will be a list of signatures of a subset of nodes in X or a cryptographic multi-signature from a subset of nodes. The advantage of using standard signature or multi-signature is that their setup phase can be realized without using a trusted party. The downside of using them is the increase in the proof size.

In protocols where the set of signers changes rapidly, every block or a group of blocks might be signed by a completely different set of signers. As a result, in such situations the above-mentioned approach of initializing the OPS TA with the one-time public verification key may not work.

One approach to generate inclusion proofs for these ledgers is as follows. For any such ledger, the OPS TA is initialized with the identities of the first set of nodes. The OPS TA can trust this set. Then, in every subsequent block where the set X gets updated, the existing set authorizes the new set with a list of signatures or multi-signatures.

In such a setting, the inclusion proof is the entire chain of authorization starting from the genesis block. The size of such inclusion proof is large. This technical problem can be addressed by a checkpointing technique. Thus, each node will only need to download the authorization chain from the latest checkpoint.

VI. Threat Model and Security Analysis

Various embodiments can provide for a number of advantages. For example, embodiments provide for a secure offline interaction system that allows devices to securely store and transfer offline amounts between devices without communicating with a server. The use of the certificates and signatures described herein provide for authentication mechanisms between the devices.

Various embodiments solve the technical problem of replay attacks (e.g., where a malicious party utilizing the same data more than once to obtain an outcome which should only be performed once). Embodiments solve the technical problem of replay attacks when devices communicate offline (e.g., without a server). Counter values can be included in the various messages described herein to prevent replay attacks during which a malicious user will attempt to spend the same offline amount twice.

Embodiments provide for a number of additional advantages. For example, users with limited internet connection may perform interactions with one another locally.

VII. OIS with Balance Recovery

From a protocol standpoint, the aforementioned offline interaction system (OIS) construction provides desirable functionalities including offline verifiability, absolute finality, redeemability, and offline transitivity. An offline user may only need to interact with the server during client setup, TA registration, deposit, withdraw, and claim protocols. Note that deposit, withdraw, and claim protocols are user dependent invocations, and are therefore not mandatory. In other words if two TEE-enabled users A and B continue to swap an offline payment of amount x, then they can (theoretically) generate infinite payments without ever interacting with the server.

However, in some cases, it can be expected that interaction with the server may be required due to unforeseen circumstances. For instance, in reference to the case outlined above, if user A loses their device (e.g., a smart phone), then user A will lose their offline balance. As a result, user A cannot generate new interactions until user A recovers their offline balance. This situation is plausible in since smart phones are sometimes lost or stolen. Keeping this aspect in mind, embodiments provide for a set of methods that help in offline balance recovery after a device is lost. The offline interaction system described herein may or may not include the balance recovery embodiments described in this section.

Since one aspect of OIS is to limit the server involvement in the interaction process, any recovery mechanism can provide offline network visibility to the server.

In this section, mechanisms to restore the online balance of parties who have lost their device will be described. First, embodiments explore limits of balance recovery and identify a few cases where balance recovery is technically difficult in the absence of additional assumptions. Then, embodiments provide for a few techniques that aid in balance recovery in these technically difficult cases.

A. Problem Statement

To outline the need for a balance recovery, a simple use case can be used to describe the technical problem. Subsequently, embodiments can enumerate abstractions from this use case to examine other complex instances that can use balance recovery. For the simple use case, assume that two users, Alice and Bob (denoted A and B henceforth), engage in an interaction protocol. Both A and B have TEE-enabled smartphones with OIS CA and OIS TA. We further assume that A has an online balance $onBal_A$ maintained by the server and offline balance $offBal_A$ maintained by the TA (where $Bal_A=onBal_A+offBal_A$). Similarly, B has an online balance $onBal_B$ maintained by the server S and offline balance $offBal_B$ maintained by the TA (where $Bal_B=onBal_B+offBal_B$). A can invoke Pay(x,receiverCert) to pay x amount to B, and B invokes PayVerify(P,receiverCert) and Collect(P) to add x to user B's account. As a result, x is deducted from A's offline balance ($offBal_A=off Bal_A-x$).

Soon after the payment, A loses their device and contacts S to recover their offline balance. S is not aware of a payment between A and B. T, therefore, the server will demand that A show all the offline payments before her $offBal_A$ is recovered to a correct state. As such, unless there is some knowledge made available to the server (in this case, Pay(x,receiverCert) by B), then no recovery mechanism is possible in this initial example situation. This means that B has to come online and synchronize with the server to facilitate balance recovery. However, in an adversarial setting, it is possible that B chooses to stay offline and chooses not to cooperate, or B is unable to come online for some reason (e.g., no Internet connection). Moreover, it is also possible that A is malicious and makes a false recovery request (e.g., requests a recovery without reporting Pay(x, receiverCert) to get $offBal_A$ instead of $offBal_A-x$). Finally, another possibility is that both A and B lose their devices simultaneously and generate concurrent recovery requests to S. In that case, no party can provide any evidence to suggest that they have sent or received a payment, making balance recovery more technically difficult.

B. Balance Recovery Objectives

For the design objectives to solve the aforementioned technical problems, embodiments aim to have the OPS server S being capable of guaranteeing offBal recovery for a user within a time bound (e.g., the user does not wait indefinitely for balance recovery). Another aim is to construct a system where a malicious user is not able to 1) make a false recovery claim, 2) deliberately or unknowingly inhibit the recovery process, and 3) affect honest users by colluding with other malicious users. Additionally, if a user has made multiple offline interactions, S can identify a maximum (ideally all) of such interactions and recover the offline balance to the correct state. Balance recovery objectives as well as a threat model are summarized below.

In some embodiments, a user (e.g., Alice) cannot make a false claim, because if they make false claims, then they will risk losing their balance upon false claim detection.

(1) Balance recovery can be possible when the S receives all offline interactions made by the sender to the receiver(s). Partial balance recovery is when S receives a subset of offline interactions made by the sender to receiver(s). (2) If the sender's device is lost, the interaction can only be provided by the interaction receiver.

(3) The receiver(s) must come online (contact S) to show the interaction received from the sender (who has lost the device). (4) If an interaction involves n parties with n TEE-enabled devices, and all devices in the system are lost, then balance recovery to the correct state is impossible.

For the threat model, embodiments can assume that a user can attempt to make a false recovery request (e.g., reporting a lost device without showing the interactions sent to other parties). A recipient, may (intentionally or otherwise) not come online and report offline interactions received by the sender. Both sender and receiver can attempt to collude to trick the server ((e.g., a sender makes a payment, reports a false recovery request, colludes with the receiver to not report to the sever). As a result, the receiver gets the payment and the sender recovers more offline balance than their share. This scenario can be abstracted to a multiparty interaction protocol in which there are n senders, m receivers, and t honest users among (n+m) total users.

C. Preliminaries

As outlined above, the server can obtain a complete view of the offline interaction network to perform balance recovery. Additionally, the server can guarantee balance recovery in a specific time bound. For that purpose, the server can utilize a synchronization parameter $\Delta$ during which it is expected that all users report their offline interactions to the server. The synchronization parameter $\Delta$ can be considered an epoch during which the server can ideally construct the offline interaction flows. The synchronization parameter $\Delta$ can be a length of time between expected user synchronization (e.g., check-in) times. For example, the synchronization parameter $\Delta$ can be 12 hours, 1 day, 1 week, 2 weeks, etc.

If a user does not synchronize with the server during $\Delta$ than all their offline interactions can be discarded. The synchronization parameter $\Delta$ is assumed to be global, utilizing a global clock available to all users. During synchronization, users can obtain the synchronization parameter $\Delta$ and/or a time stamp corresponding to the end of the synchronization period (e.g., at the end of the next epoch as designated by the synchronization parameter $\Delta$) from the server. In protocol 11, below, the synchronization protocol is formally specified and modeled utilizing the synchronization parameter $\Delta$ for a user A.

D. Limits of Balance Recovery

1. The Case of Two Parties and One Interaction

To aid with the technical analysis, the setting in which mechanisms for balance recovery are to be designed can be simplified. Consider a setting where there are two parties A and B (e.g., user A and user B), with A making at most one payment to B. Further, it can be assumed that both parties are expected to sync with the server at the end of this payment and provide a list of all sent/received payments to the server. That is, if a party (e.g., a user) does not sync with the server then the server can assume that that party is corrupt. A modified version of the OIS protocol can be constructed, which renders the OIS TA inoperable if it does not sync with the server within a specified time. This is to ensure that a party that does not sync with the server can no longer make use of the offline balance stored on the device, and in particular cannot send/receive any further payments.

Three different scenarios may take place given the above situation.

In a first scenario, suppose only one party loses their device but the other party syncs, then it is possible for the server to learn whether a payment was made by user A to user B due to the performed interaction list received from the one party that synced with the server.

In a second scenario, one party reports a device loss to the server, but the other party does not sync. In this case, the server does not know if the payment happened. The server might conclude that the party that did not sync is corrupt. In such a setting, the server can trust the party that reported the lost device on whether the payment happened or not. Fortunately, this works because of the case analysis of the two following cases.

In case 1, A reports device loss and B does not sync. In this case, B is corrupt (since they do not sync). If A is also corrupt, then irrespective of whether the payment actually happened or not, we may simply be transferring money from one corrupt party to another, and in particular, the total amount supply in the possession of the adversary (and also overall in the system) would remain unchanged. Note that if the payment value was greater than A's offline balance, then the server can safely assume that this payment never happened (as the OIS TA would never allow such a payment). In the other case where A is honest, the server S trusts what A reports.

In case 2, A does not sync and B reports device loss. In this case, A is corrupt. If B is also corrupt, then irrespective of whether the payment actually happened or not, we may simply be transferring money from one corrupt party to another, and in particular, the total amount supply in the possession of the adversary (and also overall in the system) would remain unchanged. Note that if the payment value was greater than A's offline balance, then the server can safely assume that this payment never happened (as the OIS TA would never allow such a payment). In the other case where B is honest, S trusts what B reports.

In a third scenario, both parties lose their devices (or claim to have lost their device or do not sync). In such a situation, the server will not be able to distinguish between the following two cases 1) A is honest while B is corrupt and A made no payment to B and 2) A is corrupt while B is honest and A made a payment to B, but claims to the server that it made no payment to B.

In both cases, we have A and B reporting device loss. In both cases, A claims that it did not make a payment to B. Though the setting is identical in both cases, the desirable outcomes are different. In the first case, the server could ideally recover the balances exactly as they were before the parties went offline. On the other hand, in the second case, the server could ideally adjust the balances according to the payment from A to B.

A technical problem to scenario three is to utilize backups in the system. A remedy to scenario three can involve an (honest) party somehow proving to the server whether a payment happened or not. The only conclusive way to prove that a payment happened or did not happen is by means of the payment log generated by a secure device. Indeed, a valid payment cannot be maliciously generated, since it involves generating a signature using the signing key of a secure device. Thus, the only remedy to scenario three would be for the honest party to maintain a backup of the payment log generated by its secure device and present that to the server. Thus, even if the honest party loses their device, they can present the backup of their payment log to convince the server to alter the offline balances of A and B appropriately.

However, it is noted that if an honest party loses their device and does not have a backup of their payment log, then they are not guaranteed to be able to recover their offline balance accurately. In particular, if they did receive a payment, but are unable to prove it, they may not be able to obtain the money for it. If the other party presents their payment log which contains said payment to the server, the server will be able to recover the honest party's balance. However, as the other party may either provide no payment log or possibly even an out-of-date payment log, the honest party has no guarantee in recovering its offline balance if it does not maintain a backup of its payment log.

Embodiments can provide for a system that actively disincentivizes parties from not displaying their most recent payment logs. The system can do this by having the OIS TA become inoperable if a party does not sync and display its most recent payment log. This is done by having the server attest the presented log as a means for the OPS TA to know that a party indeed synced with the server and presented the most recent payment log. Thus, it is in the interest with the server and present its most recent payment log, which would aid in the balance recovery of the honest parties.

An illustrative example can include a two party common case under the assumption that during &, A paid x to B and lost their device. After the payment, A loses their device and informs the server S. The server S assures A that their $\text{offBal}_A$ will be recovered after $On$ (after completion of the next epoch). Assuming that B is honest and synchronizes with the server S according to protocol 11, the server S will know about the payment made by A to B, and will recover the correct off $\text{Bal}_A = \text{offBal}_A - x$. If B is malicious, the server S recovers $\text{offBal}_A = \text{offBal}_A + x$ for A. Since $T_B$ knows that $\Delta_c$, has expired, it will not allow B to send x to a new recipient. Finally, if A is malicious and claims to have lost the device, she gets no benefit from the recovery protocol. From the common case, the following Lemma 1 is proposed.

Lemma 1: a sender's balance will be recovered after the next epoch from the time they send a recovery request [DeviceLost] to the server S.

Protocol 11, below, illustrates a sync protocol for a user A. During the sync protocol, A presents their payment log (from the OIS TA) that provides a payment proof to the server S which is useful in balance recovery.

At step 1 of protocol 11, the user A sends their offline payments TA.log to the server S, along with a signature σ, and the time of request $t_{sync}$ (which can be a timestamp of the time that the request was made).

At step 2a, the server S verifies the signature and checks if the time request and all payments in the log are between the previous synchronization parameter $\Delta_p$ and the current synchronization parameter $\Delta_c$. The previous synchronization parameter $\Delta_p$ is a timestamp that designates the time at which the previous synchronization epoch ended. The current synchronization parameter $\Delta_c$ is a timestamp that designates the time at which the current synchronization epoch ends. The time difference between the previous synchronization parameter $\Delta_p$ and the current synchronization parameter $\Delta_c$ is the synchronization parameter $\Delta$.

At step 2b, if the signature is valid and the time request and all payments in the log are between the previous synchronization parameter $\Delta_p$ and the current synchronization parameter $\Delta_c$, then the server S adds the payments from the payment log TA.log to the online balance $\text{onBal}_A$ (e.g., at step 2bi) and subtracts the payment from the offline balance of sender (e.g., at step 2bii).

At step 2c, the server S signs the next synchronization parameter $\Delta n$, thus creating the signature $\sigma_S$. The server S can sign the next synchronization parameter $\Delta n$ using a server secret key $\text{sk}_S$.

At step 3, the server can send the next synchronization parameter Δn and the signature $\sigma_S$ back to the user (e.g., in the message [$\Delta_n$, $\sigma_S$]).

Additionally, each TA knows that the payment log TA.log must be synchronized towards the end of $\Delta_c$. If the TA sees a non-synchronized log after $\Delta_c$, it refuses to generate new interactions. This method ensures that if a malicious user does not synchronize with the server S, the malicious user device cannot send an "invalid" payment to an honest user. To summarize, under these settings, OIS ensures that 1) all payment receivers must synchronize with the server between the previous epoch and the current epoch to get their payments honored, 2) if a user does not synchronize with the server, it cannot generate new payments, and 3) due to synchronization, the server S can keep track of all the offline payments made during the epoch.

For example, after a predetermined amount of time after an interaction, a first user device can generate a synchronization message comprising an interaction log, a time, and a signature. The first user device can send the synchronization message to a server corresponding to the server computer public key. Upon receiving the synchronization message, the server can verify the signature in the synchronization message and then verify that the time is between a last epoch ending time and a current epoch ending time. The server can then, for each interaction in the interaction log, updates an online balance of the first user device and an offline balance of another user device as indicated by the interaction log, generates a synchronization confirmation message including a time and a signature created using the time and the server computer private key, and provides the synchronization confirmation message to the first user device. The first user device can receive the synchronization confirmation message from the server and then verify the signature of the synchronization confirmation message using the server computer public key phase and will be able to recover balances to be consistent with those payments. For example, the subset of the payments can be a "monotone" subset of payments of each of the users. That is, if the server learns the 8th payment a user was involved in that phase, it also learns payments 1 through i−1 that the user was involved in that phase. Note that if this is different from reality, the corresponding OIS TAs would in any case have either been lost or rendered inoperable. This guarantees that no money can be double spent and also that no new money can be created. As before, if an honest user device maintains a regular backup of its payment log, it can send it to recover its offline balance. If it does not, it may not be able to, depending on what the other user device does.

3. The Case of More than Two Parties

Further, embodiments consider a setting where there are multiple parties, each making an arbitrary number payments to the other users within a phase or epoch. It can be assumed that all user devices are expected to sync with the server at the end of each phase, and list all sent/received payments to the server. If a user device does not sync with the server then it can be assumed that that user device is corrupt.

Much of the analysis from before applies to this case as well. However, embodiments can utilize additional techniques in order to bolster the chances of balance recovery for the honest users. The first of these techniques is chained payments, which is outline here and explain in further detail in herein. Chained payments can include chaining individual payments with one another. A payment can be a composite payment that contains the details of the payment under consideration as well as several other payments that occurred in that epoch. Using chained payments, a payment will find its way into the logs of potentially several other user devices in the network, and thus has a higher probability that an honest user device in the network will sync with the server at the end of the phase. This is a heuristic solution and can provide the guarantee that if some user device in a

---

Protocol 11: Sync Protocol

Sync Protocol
A sends her latest list of received offline payments TA.log to the server S.
  1. A sends [$T_A$.log, $t_{sync}$, $\sigma$ ] ← $T_A$ .Sync( ) to S.
  2. Upon receiving [$T_A$.log, $t_{sync}$, $\sigma$ ] from A, server S does the following:
    a) Verify that SigVerify([log, $t_{sync}$], $\sigma$, $T_A$.vk) $\overset{?}{=}$ 1 and $\Delta_p < t_{sync} <$
    $\Delta_c > 0$ (payments and synchronization time is between the previous
    epoch and the current epoch);
    b) For each P ∈ log:
      i. S.onBal$_A$ ← S.onBal$_A$ + P.amount;
      ii. S.offBal$_B$ ← S.offBal$_B$ − P.amount, where B denotes the
      sender of the payment P .
    c) Send [$\Delta_n$, $\sigma_S$] to A, where $\sigma_S$ ← Sign($\Delta_n$, sk$_S$).
  3. Upon receiving [$\Delta_n$, $\sigma_S$] from S, client A invokes $T_A$.SyncVerify(t, $\sigma$).

---

2. The Case of Two Parties and Multiple Interactions

Now consider a setting where there are two users, user A and user B, with user A and user B making an arbitrary number payments between each other within a phase or epoch. It can be assumed that both users (specifically, the user devices of the users) are expected to sync with the server at the end of each phase, and list all sent and received payments to the server. If a user device does not sync with the server then it can be assumed that that user and/or user device is corrupt.

The analysis of this case is similar to the one corresponding to a single payment. Based on the payment logs that are presented to the server at the end of a phase, the server learns an arbitrary subset of the payments that occurred in that portion of the payment chain, which was created after a payment in the chain was, made syncs with server, then the payment would be known to the server at the end of the phase.

As such, chained payments can provide for recovery schemes for multi-party payments. Note that during the current epoch $\Delta_c$, a user device B can make offline payments to other user devices. Now assume that a user device A provided an amount x to the user device B, and then the user device B provided (e.g., forwarded) the amount to a user device C. Further assume that the payment ended up with a user device Z. All payments may have been made within the current epoch $\Delta_c$. If the user device B does not synchronize with the server S during $\Delta_c$ (even at the risk of not being able to generate any payment in the future), then the server S will not know any payment between the user device A and the user device B, and will incorrectly recover offBalA=offBalA+x. Therefore, the two-party OPS recovery protocol may not be generalized to a multi-party recovery protocol. To address this limitation, embodiments provide for two methods that will allow balance recovery in a multi-party setting that will be described in further detail below.

This observation leads to Lemma 2, which states that, if a payment chain consists of multiple branches and there is at least one honest user on that branch, then the server S will fully recover the offline balance of all intermediaries up to the honest user.

E. Chained Payments

One of the techniques provided by embodiments, in order to aid balance recovery, is called chained payments. As mentioned before, the user devices can chain each payment with the previous payment.

Figures 8A, 8B, 8C:
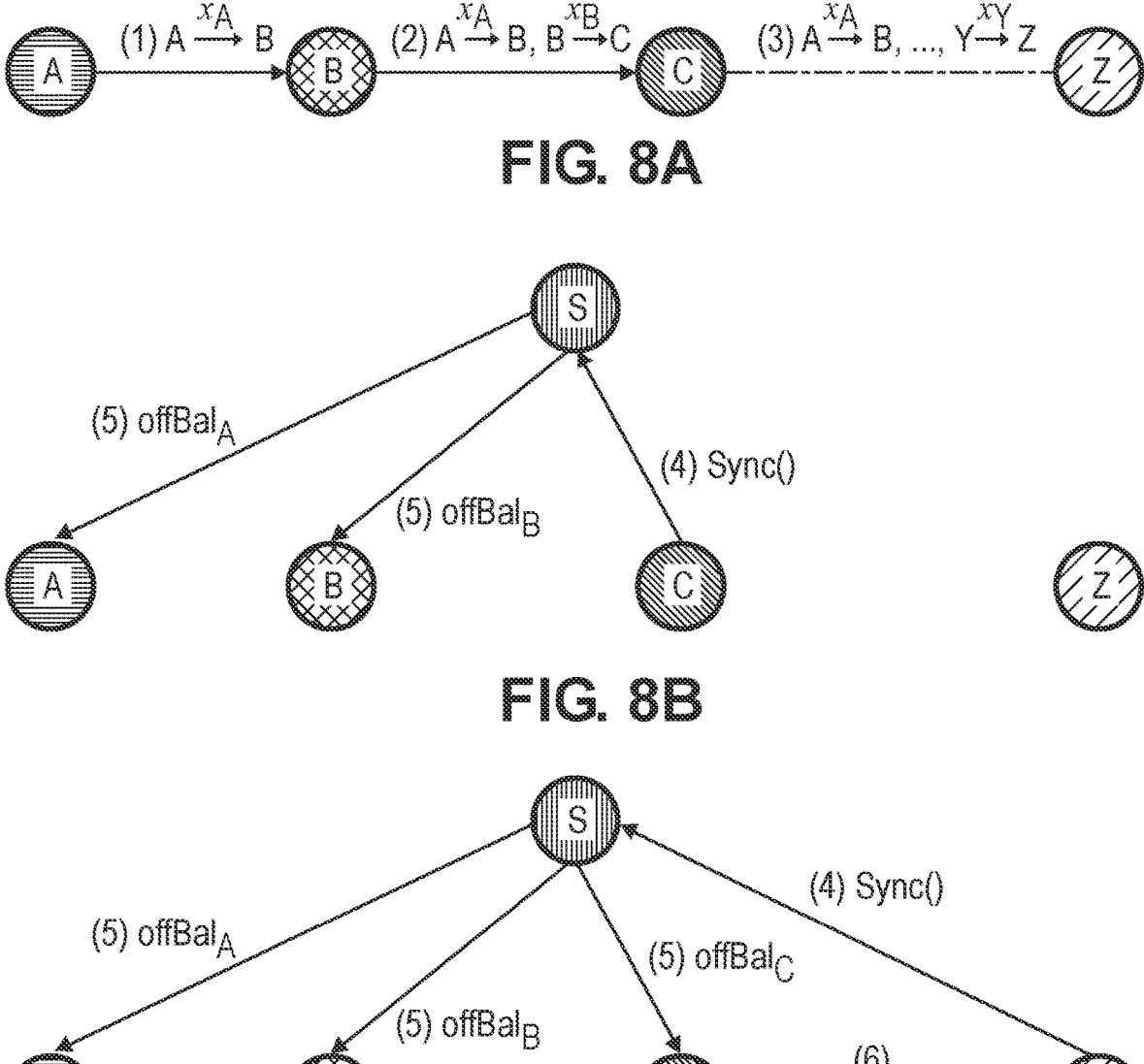
FIGS. 8A-8C illustrate chained interactions in an offline interaction system according to embodiments.

FIGS. 8A-8C illustrate chained interactions in an offline interaction system according to embodiments. For instance, a user device A can pay $x_A$ to a user device B modeled as $$A \overset{x_A}{\to} B,$$

and then the user device B pays $x_B$ to a user device C, as illustrated in FIG. 8A. The first payment can be incorporated into the second payment. For example, the previous payment $$A \overset{x_A}{\to} B$$

can be incorporated into the next payment to make the payment sequence:

$$A \overset{x_A}{\to} B, B \overset{x_B}{\to} C.$$

This payment sequence will form a payment chain in which a user device Z (e.g., a user device at the end of the chain of payments) will know all user devices involved in the payment chain, eventually linking to the user device A. If any honest user device in the chain synchronizes with the server as depicted in FIGS. 8B-8C, then the server will know the payment sequence from the user device A all the way up until that honest user device that synced with the server. This will allow the server to successfully learn about all the payments involving many user devices even though only one user device, which may not have been involved in those payments, syncs with the server.

For example, FIG. 8B illustrates the user device C syncing with the server S. Due to the user device C synching with the server S, the server S learns about the payments performed by the user device A and the user device B. The server S can update the offline balance of the user device A and update the offline balance of the user device B accordingly.

As another example, FIG. 8C illustrates the user device Z syncing with the server S. Due to the user device Z synching with the server S, the server S learns about the payments performed by the user device A, the user device B, the user device C, and any user devices in the chain between the user device C and the user device Z. The server S can update the offline balance of each user device in the chain accordingly.

Figure 9A:
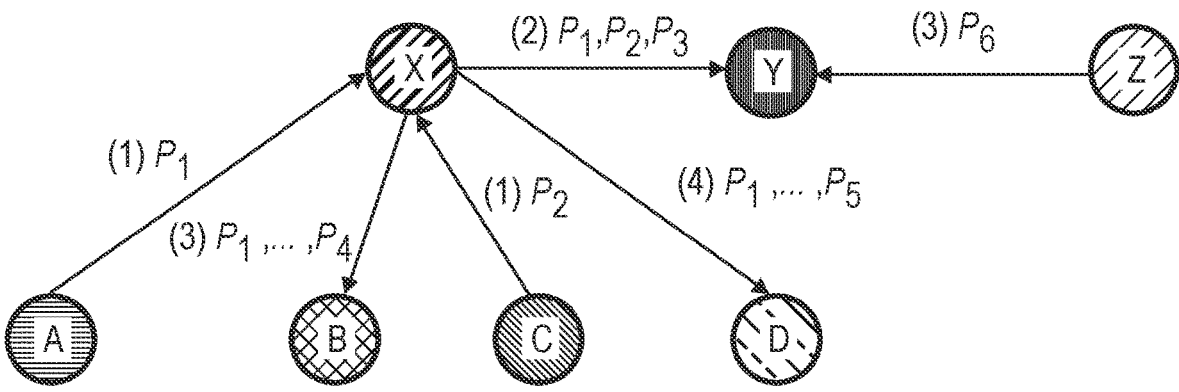
FIGS. 9A-9B illustrate conglomeration of chained interactions in an offline interaction system according to embodiments.
Figure 9B:
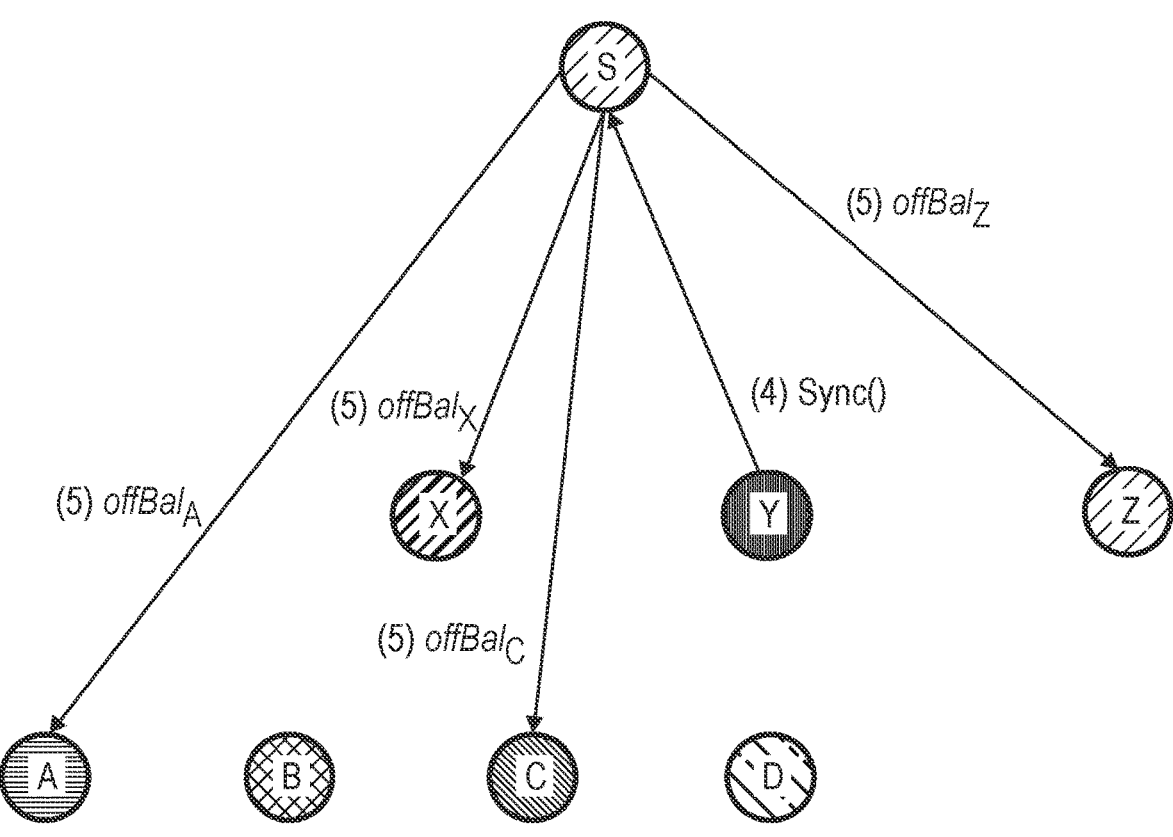

In a more general setting, in some cases, chains in different parts of the system can merge. FIGS. 9A-9B illustrate conglomeration of chained interactions in an offline interaction system according to embodiments. In such cases, exact guarantees provided by the balance recovery mechanisms according to embodiments would depend on how the chains interact. As a generalized rule, the more chains a user's payment is involved in, the higher the chance that some honest user device in a chain syncs with the server and makes the server aware of that payment.

A sample scenario is depicted in FIGS. 9A-9B (for brevity, payment objects are represented by $P_i$ for i=1, 2, 3, . . . ). For example, FIG. 9A illustrates user device X receiving payments from the user device A and the user device C. Further, the user device X provides payments to the user device B, the user device D, and the user Device Y. The user device Y can receive the payment from the user device X as well as a payment from the user device Z. The aforementioned payments can all occur during a single epoch. At the end of the epoch, the devices can sync with the server S. For example, as illustrated in FIG. 9B, if only the user device Y syncs with the server S, the server S can still receive enough data about all of the payments were chained and provided to the user device Y. Specifically, the server S can learn of the payment chains leading from the user device A and the user device C to the user device X, then to the user device Y. The server S can also learn of the payment from the user device Z to the user device Y. As such, the server S can update the offline balances of the user device A, the user device X, the user device C, the user device Y, and the user device Z. However, in this case, the server S does not learn of the payments made from the user device X to the user device B or the user device D. This is because, these payments are not chained to any payments provided to the user device Y, which is the only user device that synced with the server S.

Protocol 12, below, illustrates a recovery protocol that enables a user to recover their offline balance (e.g., offBal$_A$) to the correct state. Protocol 13, below, further illustrates a recovery protocol that enables the user to recover their offline balance to the correct state.

Protocol 12, can be performed with a first user loses their user device. For example, the user of the first user device may loss possession of the first user device. At step 1, the user can utilize a secondary device to provide generate a lost device balance recovery message and send the lost device balance recovery message to the server. The secondary device can be any suitable device (e.g., a computer, a laptop, a phone, etc.). At step 2, upon receiving the lost device balance recovery message, the server can add a first user device public key to a blacklist, wait until the end of the current epoch for other user devices to sync with the server, update an online balance of the first user device based on synchronization of devices during the epoch, and set an offline balance of the first user device to zero.

Protocol 12: Recovery Protocol

```
Recovery Protocol
User A reports loss of their user device A to the server S and requests to recover
their unspent offline balance.
    1. User A sends a [Device Lost] messsage to the server S (e.g., using a
    computer),
    2. Upon receiving the [Device Lost] message from the user A, the server S
    does the following:
```

```
        (a) Add vk_A (user device A secret key) to blacklist;
        (b) Wait for 2Δ time during which all users including a user device B
        invokes the Sync Protocol (see protocol 13);
        (c) S.on Bal_A ← S.on Bal_A + S. off Bal_A (correct offline balance restored);
        (d) S. off Bal_A ← 0.
```

Protocol 13: *TA* Methods for Balance Recovery Support

```
TA Methods for Balance Recovery Support
Sync ():
    1. t_{sync} ← now,
    2. Output [T. log, t_{sync}, σ], where σ ← Sign ([T. log, t_{sync}], T.sk).

Sync Verify (t, σ):
    If t < t_{sync} + δ and Sig Verify (t, σ, vk_s) ?= 1, then output 1. Otherwise, output
    0.

Check Sync ():
    If Δ_p < t_{sync} < Δ_c > now, then output 1. Otherwise, output 0.

Withdraw (x, i, σ_S):
    1. Abort if Check Sync () ≠ 1, ...

Pay (x, r, cert_{receiver Cert}):
    1. Abort if Check Sync () ≠ 1,
```

F. Collateral

A limitation of chained payments technique is the linearly growing payment size with each payment. If mandated synchronization period is significantly large (e.g., in days), the payment size can significantly increase, adding storage penalty at the secure storage. One way to alleviate this issue is to store only a certain number of payments, for instance randomly selected payments. A random selection of payments to chain will also guarantee that different user devices will be able to inform the server of different payments when they sync, making it more difficult for an adversary to conceal payments.

Another approach to resolve this technical problem is a technique provided by embodiments referred to as collaterals. In this setting, each user device establishes a collateral with the server such that the collateral value is always greater than the payable offline balance. For instance, if the user device A establishes a collateral $A_C$ with the server, then $A_C$>offBal$_A$. During the Sync protocol, the server also provides the collateral value to the trusted application. Now, when the user device A makes an offline transaction, the TA checks if the sum of all the offline payments made is less than the collateral. If the user device A does not sync with the server, the server uses the collateral to resolve any disputes that arise with respect to payments that the user device A made. Note that this does effectively correspond to deducting the offBal$_A$, should the offline balance ever get restored. This is because the TA is now unable to make any payments beyond the collateral value and the only way to obtain more payable funds is to sync with the server, which will be able to determine how much of the collateral is to be restored as payable funds. This process can be applied to the payment chain shown in FIG. 9A. If a user device Z is an honest user device, then receiving a payment from the user device Y, and all parties from the user device A to the user device Y are corrupt and do not sync with the server, then the user device Z will synchronize with the server and show that it has received a payment from the user device Y. The server will use that knowledge to deduct the collateral from the user device Y's online balance and honor the user device Z's payment. All other payments by the intermediaries gets rejected and the user device A recovers its offline balance. Note that as opposed to the chained payment where all intermediaries get their offline payments honored, in collateral payments only the user device Y and the user device Z get their payments honored.

The techniques of chained payments and collaterals are not exclusive to one another and can be used in conjunction with each other to achieve tradeoffs with respect to the mandated synchronization periods (epoch size), storage/communication limits, recovery patterns, etc.

Furthermore, the system can be viewed from a game theoretic approach lens. For example, assume a case where the user device A goes to buy a coffee from the user device B for x amount, and also steals the user device B after the payment. Now, both the user device A and the user device B can report a lost device to the server(maliciously and non-maliciously, respectively). In this case, the server will never be able to recover the true offline balance for both parties and the user device A will get away with having an offline balance prior to the payment made to the user device B, and will also consume the coffee.

To prevent this situation from happening, embodiments can introduce a belief that the recipient might have a backup stored alongside the original user device. In other words, after receiving a payment from the user device A, the user device B's TA will make a backup on another device (e.g., a server, a computer, a laptop, etc.) to act as a proof. If the user device B shows that proof to the server S, then the server S can apply a severe penalty on the user device A. Therefore, this belief of backup can force the user device A to behave honestly since now it becomes a guessing game conditioned on the fact that the user device B may or may not have a backup. As a result, the malicious user device A's probability of success reduces from 100% to only 50%.

VIII. Further Embodiments

A. Privacy-Preserving Offline Interaction System

In this section, a privacy leak in the basic protocol is discussed. Solutions to the privacy leak are provided herein, for example, by using group signatures. For example, a privacy leak may occur due to the fact that the verification key of each offline interaction system instance is unique. Therefore, the receiving party of the interaction (see Protocol 9), can tie each interaction to a particular offline interaction system instance, and hence to a particular user. This discloses certain information such as the interaction frequency, the amounts paid, etc. of the users. A naive solution to this technical problem would be for clients generating a new key-pair for their trusted application for each new transaction. However, since each offline interaction system verification key should be certified by the server (see Protocol 4), this incurs a significant overhead for clients.

A technical solution to this technical problem for the setting described herein is to utilize group signature schemes (GSS). For example, with a GSS, there exists a unique verification key under which all the signing keys, and hence all the offline interaction system instances, can be verified. Given that, it is not possible to tie the sender of an interaction to a verification key as all interactions are verified under the same verification key. Then with a group signature scheme, the base protocol can be augmented as follows where the server plays the role of group manager.

First, the server generates a verification key and the corresponding secret key shares. Second, the server signs the verification key with the server secret key and makes the resulting signed verification key public. Third, the server distributes the secret key shares to the user devices during trusted application registration. Fourth, whenever a trusted application performs an interaction, the interaction is signed with the received secret key share. The receiving device in the interaction can then verify the signature with the verification key of the global certificate.

Since each signature is verified under a single, global verification key, a receiving device cannot distinguish one sender device from another. In some embodiments, the group manager can disclose the identities of senders and might add/remove members from the group.

B. Hierarchical Offline Interaction System

In a real-world scenario, certain countries might issue some restrictions on the offline interaction system ecosystem. For example, countries might want certificate issuers to be vetted by the central bank of the country. To suit offline interaction system to such a setting, embodiments can establish a hierarchical chain-of-trust on a trusted application certificates as illustrated in FIG. 6.

Figure 6:
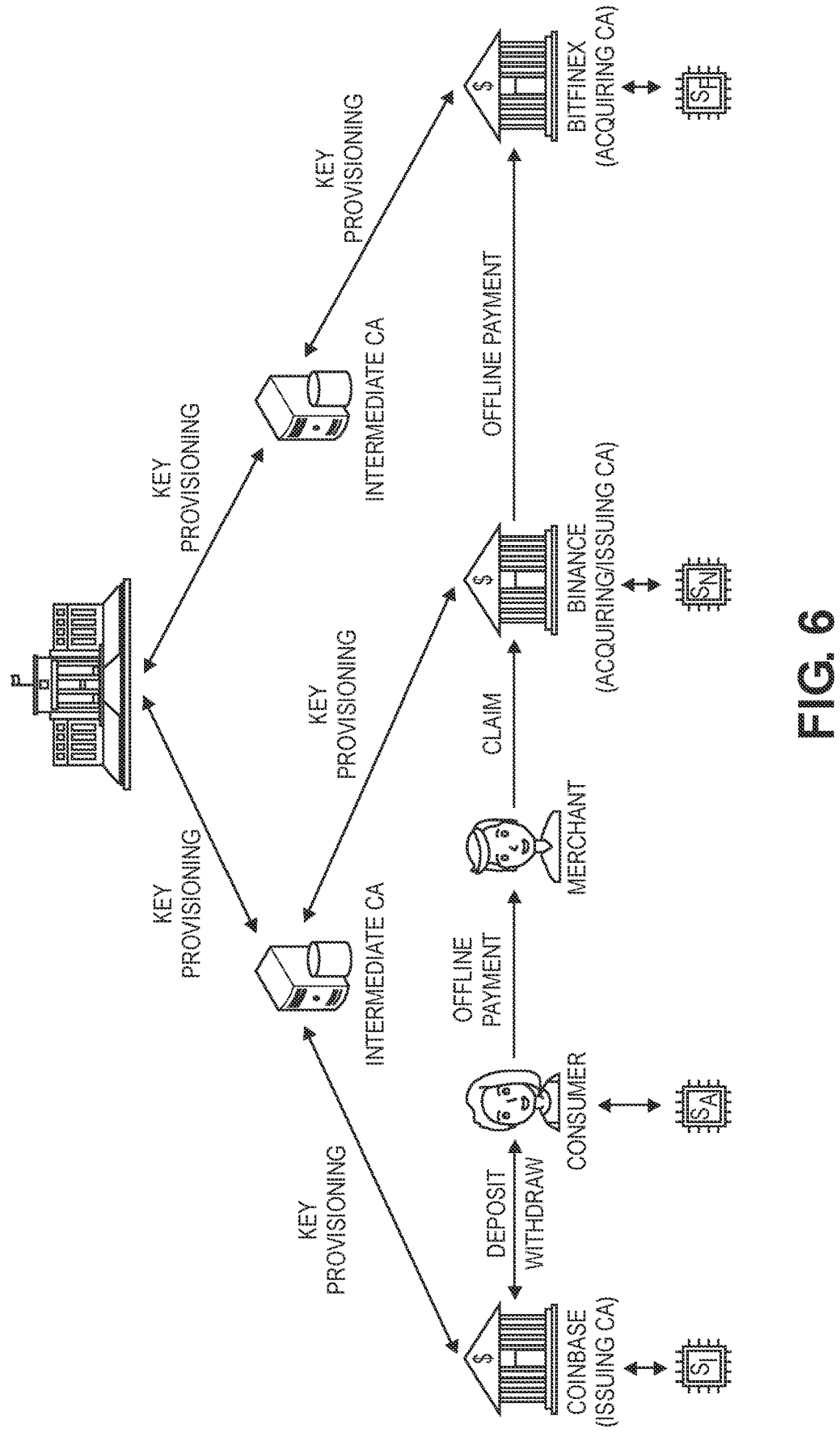
FIG. 6 illustrates a hierarchical offline interaction system according to embodiments.

FIG. 6 illustrates a hierarchical offline interaction system. Here for example, a certain service such as a commercial bank A might issue trusted application certificates to clients to enroll them in the ecosystem. Yet, the law of the country in which offline interaction system operates might require every certificate issuer to be vetted by the central bank. This can be achieved by having a chain-of-trust on trusted application certificates. That is, every certificate issued by the commercial bank A can have a signature chain all the way back to the central bank with some possible intermediate entities in the middle.

Digital payments today represent an account-based system of debiting and crediting accounts operated by the financial institutions, where the ownership of a payment account is tied to a user's public identity. With the emergence of distributed ledger technology, there have been growing interests in a new form of token-based digital payment, where the token itself is the money, and the ownership of the money is determined by a user's access to a private cryptographic key that provides access to the user's digital wallet. Access to these wallets are typically facilitated by entities, known as wallet providers, that offer secure access to the cryptographic keys as well as some banking and other financial capabilities.

Due to growing interests in token-based payments, the possibility of issuing a new type of central-bank money, known as central bank digital currency (CBDC) is contemplated. One design would issue this new money in the form of cryptographic tokens backed directly by central bank reserves to enable consumers and businesses to issue payments in the form of "digital cash."

However, it would be impractically burdensome to have a central bank perform all the duties of issuing and managing digital currency, such as the heavy processing needed for widespread creation and distribution of digital currency.

In a central-bank (CBDC) model, the money in transit should remain the liability of its trusted issuer (e.g., a central bank in the case of CBDC), meaning that its value is always guaranteed by the issuer as long as the recipient can easily verify the authenticity of the money. This ensures that (1) the money was issued properly according to a specific set of rules (aka, a monetary policy that has parallels to the existing financial system) set by the issuer, and (2) the money maintained its value in transit (i.e., was neither double-spent nor counterfeited).

In the digital world, this can be implemented using public-key cryptography, where the money in transit carries a digital signature that can only be generated directly by the central bank or indirectly by one of the central bank's certified delegates. Any recipient of the money can then simply authenticate it by verifying the signature against the public key of the central bank and/or the certificate of its trusted delegate. Public-key cryptography could offer significant advantages for security and compliance over cash.

A two-tier hierarchical trust infrastructure delivered through certified delegation, which allows the central bank to outsource the complexity of managing digital certificates for CBDC tokens to a set of potentially regulated, permissioned entities that derive their authority from the central bank, through a hierarchy of digital certificates originated from the central back at the root, can be present. This hierarchical trust design resembles the hierarchy of certificate authorities (CAs) in a public-key infrastructure (PKI) that plays a vital role in enabling the secure transfer of information over the Internet.

A PKI for CBDC that can significantly facilitate the secure issuance and transfer of CBDC with the central bank serving as the root CA and other financial institutions (FIs) serving as intermediate CAs who authorize wallet providers to facilitate CBDC payments securely can also be present. The core advantage of the two-tier model is that it decouples the certificate infrastructure (tier 1) from the critical latency path of CBDC payments (tier 2), allowing wallet providers such as banks and other financial institutions to securely process CBDC payments at a high scale without imposing any overhead on the highly-protected PKI nodes.

As an overview of a CBDC Two-Tier Model, a first tier, being an infrastructure tier, can include a root certificate authority. This can be a central bank. The central bank can authorize other entities (e.g., banks, wallet providers, fintechs, etc.) to be a second layer of certificate authorities. Together, these entities make up the infrastructure tier. These entities can authorize further entities to be a next layer of certificate authorities. Additional layers of authorized and certified actors can be included in either tier.

The second tier, being the payment tier, can include wallet providers (or other suitable entities such as banks), and users (e.g., consumers and merchants). Wallet providers can provide CBDC and/or keys to the users, all based in the hierarchy of trust spanning back up to the root of trust.

The tiers can demonstrate how different tasks are divided among different groups and layers of entities. By distributing the responsibility of certificate provisioning to other entities besides just the central bank, and by enabling other entities to create and distribute CBDC besides just the central bank, the system becomes more efficient and scalable.

Each entity in a higher tier can certify another entity in a lower tier. This can include authorizing the lower entity to carry out one or more actions (e.g., creating or issuing digital currency), as well as providing a certificate. The certificate can include the lower entity's public key, information about authorization and permissions, and a digital signature using the upper entity's private key. As a result, anything digitally signed by the lower entity (e.g., with the lower entity's private key) can be verified using the lower entity's public key as shown in the certificate, and which may be trusted based on the certificate (e.g., due the upper entity's signature being present, due to the upper entity's signature being trustworthy, and/or due to the upper entity being certified by a higher entity through another certificate). In other words, public key infrastructure (PKI) can be used to distribute trust throughout the network, and any actions can be verified as authorized through certificates. Any other suitable PKI features can be incorporated into the two-tier hierarchy infrastructure.

As an example of steps for CBDC Creation in the first tier, the central bank and/or other certificate authorities can create CBDC. For example, uniquely identifiable (e.g., via a serial number) digital tokens can be generated. A record of the created CDBC can be stored in via distributed ledger technology (DLT), such as a blockchain. Additionally, the central bank can issue a smart contract, which can set rules and limits for which entities can create and distribute currency (e.g., total amount, amount per month, amount per year, amount per week, to whom CBDC can be distributed, etc.). The smart contract can also be stored via the DLT and may govern how the DLT is managed.

Example steps for CBDC Distribution in the second tier will be discussed. CBDC can be provided to various wallet providers. These wallet providers can then issue CBDC to users and user accounts, as well manage interactions between users and exchange of CBDC. Any suitable steps of CBDC allocation, distribution, and exchange can be recorded via one or more distributed ledgers (e.g., blockchains).

With trusted certificates distributed throughout the system, CBDC distributed throughout the system, and distributed ledgers tracking changes, the CBDC can then be used for transactions. For example, when CBDC is used for a payment (or distributed downward through the network), the payment sender can digitally sign a transaction message indicating that a certain token is being transmitted to a certain recipient. The recipient and/or other network entities can verify that the sender owns the token based on a DLT payment record, so the sender's digital signature (e.g., using their private key) can be a trusted and honored indicating of token transmission. The payment message can identify the recipient by indicating a public key associated with the recipient. As a result, the recipient may be the only entity that can use that given token in a subsequent payment, as the recipient may be the only entity in possession of the private key corresponding with the receiving public key identified in the payment message.

The central bank (or other root of trust) may be liable for CBDC throughout the system. For example, in some embodiments, a user, wallet provider, or other entity may be able to exchange CBDC for fiat currency at the central bank.

The two-tier model can be applied to and improve several other systems, such as Universal Payment Channels (UPC), offline interaction systems, and blockchain sharding.

An offline interaction system can enable user to user digital payments while not connecting to intermediary network systems. Applying the two-tier hierarchical trust infrastructure model for CBDC can improve OIS. For example, developing on "offline" capability under the hierarchical trust infrastructure for CBDC can bolster the security and practical usage of point-to-point offline payments using authorized hardware. An offline protocol, such as the one described above, can be a potential feature of CBDC by bringing the primary point of trust to an offline device under this infrastructure. CBDC as digital cash can move instantly across multiple payment rails and condition without necessarily needing to directly involve any intermediary during transfers. For example, if the sender and the recipient of a payment have relationships with different wallet providers, they should still be able to transact with each other instantly in an ad-hoc, point-to-point fashion through trusted hardware without communicating with their wallet providers. This enables high throughput as payments that can still happen under unreliable network conditions, and by design, privacy preserving by avoiding sharing unnecessary payment information with the intermediaries.

Accordingly, utilizing an offline payment system that allows a user (e.g., a customer) to make digital payments in CBDCs to another user (e.g., a merchant) can provide a technical solution to the technical challenge presented by offline payments—the challenge of protecting the system from financial crimes and the challenge to avoid exposing either the buyer, seller, or the central bank to the risk that the payment may not ultimately be settled.

As an example of an offline CBDC payment integrated with Two-Tier Model, offline interactions can take place where CBDC is sent by one user to a second user as described in the examples above.

The offline interaction system described herein can be abstracted into a hierarchical offline interaction system design where users across different OIS layers can seamlessly exchange interactions through a hierarchical structure formed by their servers. To tailor the offline interaction system design for such a setting, embodiments can establish a hierarchical chain-of-trust on trusted application certificates.

FIG. 6 shows an illustration of Hierarchical OIS. Here for example, a certain service such as a commercial bank A might issue OIS TA certificates to clients to enroll them in the ecosystem. Yet, the law of the country in which OIS operates might require every certificate issuer to be vetted by the central bank. This can be achieved by having a chain-of-trust on OIS TA certificates. That is, every certificate issued by commercial bank A can have a signature chain all the way back to the central bank with some possible intermediate entities in the middle.

For the hierarchical OIS, the rudimentary change involves verifying signatures of the entities in the chain-of-trust. That allows users to validate the authenticity of all the servers involved in the chain (leading up to the root server) and trust the information provided by the server. Apart from this change, other OIS functions will relatively remain the same. However, to facilitate the signature verification of servers in the chain-of-trust, it is possible to employ the following schemes:

Aggregate signature scheme can be plugged into the system such that the chain endpoint can aggregate all signatures into a single signature with an aggregate signature scheme. For that purpose, one example is Boneh-Lynn-Shacham (BLS) scheme. In addition to providing a trust mechanism for the chain-of-trust, this scheme can also reduce the communication overhead and verification time.

Combining hierarchical OIS with other extensions may present additional technical problems which are solved herein. For instance, the amount recovery (described in the next section) requires server synchronization. In the chained payment model, embodiments might leverage the linking mechanism among payments and combine it with aggregate signatures to make the hierarchical OIS work.

Combining hierarchical OIS with a particular privacy setting strategy (e.g., fully dynamic) may not work. In that case, only a semi-dynamic scheme will work should be fine. Each server can maintain their own groups. This reveals to which group a client belongs though (as there are possibly multiple.) A simple fix is to have the upper layers in the chain of trust to maintain the group. This can be straightforward too assuming an OEM generates devices for every server, say under a central bank.

Embodiments can be used with a Universal Payment Channels (UPC) system. A UPC system can be a system for processing cross-ledger digital payments between two distributed ledgers accepting different cryptocurrencies. UPC consists of a Network Hub that allows crypto wallet providers (as banks) to establish collateralized payment channels with the Network (e.g., a payment processing network) and authorize cross-ledger payments in a secure way. The protocol leverages cryptographic digital signatures as well as smart contracts to ensure strong security against malicious activities by untrusted wallet providers and allows transactions to be authorized instantly at a massive scale via off-chain payment channels. UPC can be used to process cross-CBDC transactions using multiple hubs interconnected via the hierarchical CBDC model, where the central bank certifies UPC hubs through a hierarchy of certificate authorities.

Off-chain CBDC payment, as well as Universal Payment Channels integrated with Two-Tier Model can be utilized. Additional DLT systems can be included in the second tier.

Blockchain sharding (or other DLT systems) can also benefit from CBDC as supported by a hierarchical trust infrastructure. Blockchain sharding can include both on-chain and offchain payments.

Figure 7:
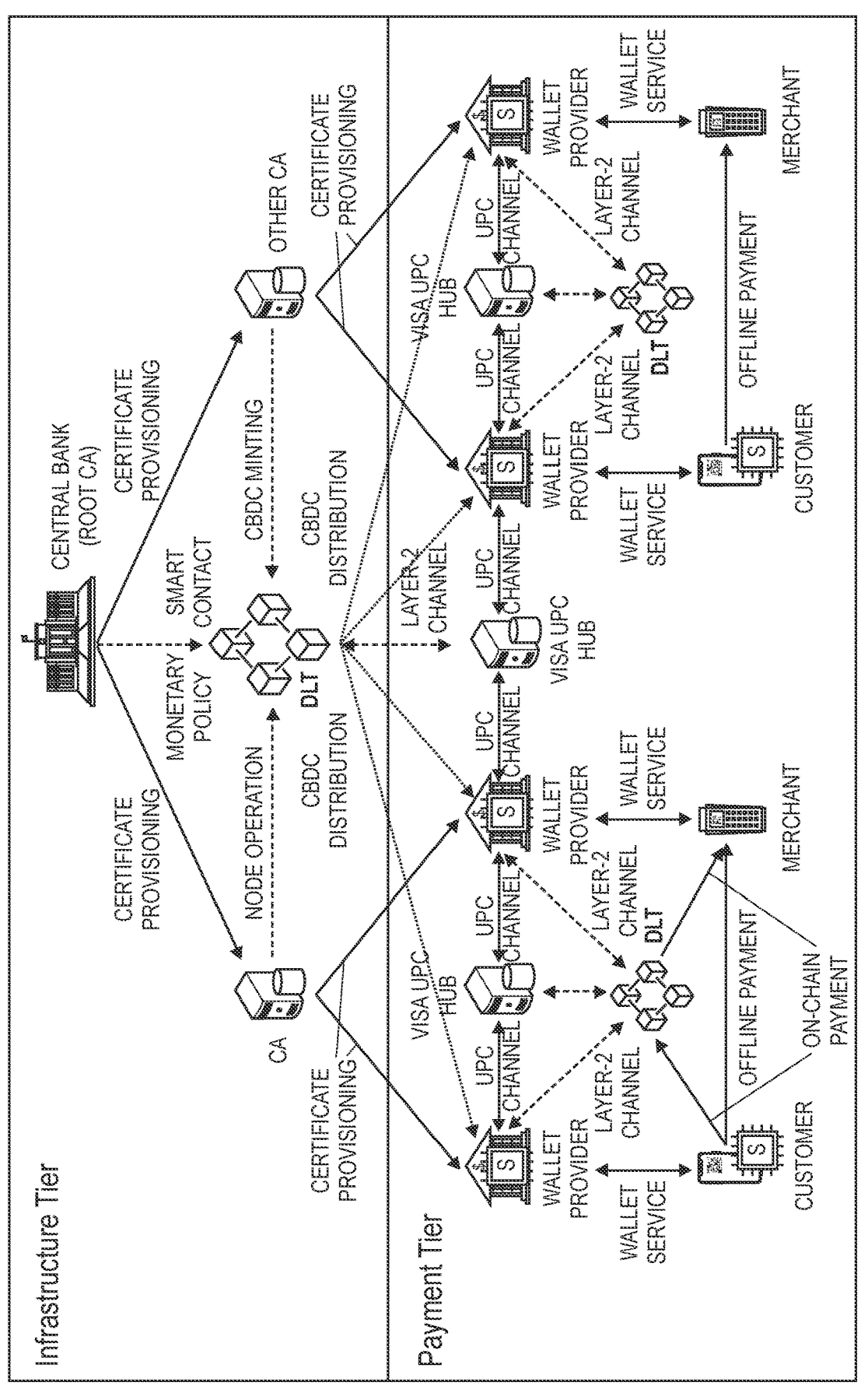
FIG. 7 illustrates an offline interaction system integrated with hierarchical two-tier model according to embodiments.

FIG. 7 shows an example of the full CBDC model including Two-Tier infrastructure integrated with other systems, such as UPC channels, offline payment systems, off-chain payments, and one or more DLTs.

Various embodiments can include a method comprising: receiving, by a digital wallet provider computer, a certificate from a certificate authority computer, the certificate including a first digital signature associated with the certificate authority computer, the first digital signature being verifiable using a first public key associated with the certificate authority computer, the certificate including a second public key associated with the digital wallet provider computer, and the certificate indicating that the digital wallet provider computer is authorized to create or distribute digital currency associated with a central bank; generating, by the digital wallet provider computer, a digital currency transfer message for providing digital currency to a user, the digital currency transfer message indicating an amount of digital currency and a third public key associated with the user; generating, by the digital wallet provider computer, a second digital signature for the digital currency transfer message using a second private key associated with the second public key; and transmitting, by the digital wallet provider computer, the digital currency transfer message, the second digital signature, and the certificate to a user device associated with the user, wherein the user device verifies the first digital signature included in the certificate using the first public key associated with the certificate authority computer, and wherein the user device verifies the second digital signature using the second public key associated with the digital wallet provider computer.

According to some embodiments, the certificate, the first public key, and the second public key are components in a public key infrastructure where the root of trust is a central bank, and wherein the public key infrastructure is divided into two tiers including a first tier and a second tier, the first tier including first set of computers that issue certificates, and the second tier including a second set of computers that manage payments.

According to some embodiments, the certificate is a second certificate, wherein a first certificate associated with the certificate authority computer indicates that the certificate authority computer is authorized to provision other certificates, and the method further comprises: receiving, by the digital wallet provider computer, from the certificate authority computer, a root of trust public key index and the first certificate, the first certificate including the first public key; obtaining, by the digital wallet provider computer, a root of trust public key identified by the root of trust public key index; verifying, using the root of trust public key, the first certificate; obtaining, by the digital wallet provider computer, the first public key from the first certificate; and verifying, using the first public key, the first digital signature.

According to some embodiments, the method further comprises: determining, by the digital wallet provider computer, based on a smart contract provided by a root-of-trust computer, that the digital wallet provider computer has not yet exceeded a digital currency production limit; and before generating the digital currency transfer message, generating, by the digital wallet provider computer, the digital currency, the digital currency including at least one digital token.

According to some embodiments, the digital token is unique and identifiable based on a unique serial number.

According to some embodiments, the method further comprises: before generating the digital currency transfer message, receiving, by the digital wallet provider computer, from the certificate authority computer, the digital currency, the digital currency including at least one digital token.

According to some embodiments, the digital token was generated by a root of-trust computer.

According to some embodiments, the method further comprises: updating, by the digital wallet provider computer, a blockchain based on the digital currency transfer message.

According to some embodiments, the method further comprises: generating, by the digital wallet provider computer, for the user device, a second certificate including the third public key as part of a user registration process; generating, by the digital wallet provider computer, a third digital signature for the certificate using the second private key; and transmitting, by the digital wallet provider computer, the second certificate and the third digital signature to the user device.

According to some embodiments, the user is a first user and the user device is a first user device, wherein the first user device generates a payment message indicating that the digital currency is being provided to a second user, wherein the first user device generates a third digital signature using a third private key associated with the third public key, and wherein the first user device transmits the payment message, the third digital signature to a second user device associated with the second user.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a first device from a server computer, an index value, wherein the index value is also stored at the server computer and is an interaction counter adapted to prevent replay attacks;

receiving, by the first device from a second device, an interaction request message comprising an amount of digital currency and a second device certificate during an interaction between the first device and the second device;

verifying, by the first device, the second device certificate in the interaction request message using a server computer public key corresponding to a server computer private key;

determining, by a trusted application in a secure element of the first device, whether or not the amount of digital currency is less than an offline amount of digital currency stored in the secure element;

when the amount of digital currency is less than the offline amount of digital currency, determining, by the trusted application, an updated offline amount of digital currency based on the amount of digital currency;

incrementing, by the first device, the index value by one to form an updated index value;

generating, by the trusted application, an interaction response message comprising the amount of digital currency, the updated index value, and a trusted application certificate;

signing, by the trusted application, the interaction response message comprising the amount of digital currency, the updated index value and the trusted application certificate using a trusted application private key to produce an interaction response message signature; and providing, by the first device, the interaction response message including the interaction response message signature to the second device, wherein the first device receives the interaction request message during an offline interaction between the first device and the second device.

2. The method of claim 1, wherein the interaction response message further comprises the second device certificate, and wherein the second device verifies that the second device certificate received in the interaction response message matches the second device certificate provided in the interaction request message.

3. The method of claim 1, wherein the first device is a first mobile phone and the second device is a second mobile phone.

4. The method of claim 3, wherein the interaction counter is locally tracked by both the first device and the second device.

5. The method of claim 1 further comprising:

prior to receiving the interaction request message, receiving, by the first device, a first device certificate and the trusted application certificate from the server computer, the server computer associated with the server computer public key.

6. The method of claim 1 further comprising:

prior to receiving the interaction request message, receiving, by the first device the offline amount of digital currency from the server computer, the server computer associated with the server computer public key; and storing, by the first device the offline amount of digital currency in the secure element.

7. The method of claim 1, wherein the offline amount of digital currency is securely stored in the secure element.

8. The method of claim 1, wherein prior to receiving the interaction request message, receiving, by the first device, a first device certificate and the trusted application certificate from the server computer, the server computer associated with the server computer public key; and wherein the first device certificate is issued to the first device by an intermediate certificate authority, wherein the intermediate certificate authority is the server computer associated with the server computer public key, and wherein the server computer public key is issued to the intermediate certificate authority in an intermediate certificate by a root certificate authority.

9. The method of claim 8, wherein the first device certificate, the second device certificate, and the server computer public key are components in a public key infrastructure where a root of trust is the root certificate authority, and wherein the public key infrastructure is divided into two tiers including a first tier and a second tier, the first tier including first set of computers that issue certificates, and the second tier including a second set of computers that manage interaction, wherein the second tier includes the first device and the second device.

10. The method of claim 1 further comprising:

after a predetermined amount of time, generating, by the first device, a synchronization message comprising an interaction log, a time, and a signature; and sending, by the first device, the synchronization message to the server computer, the server computer corresponding to the server computer public key.

11. The method of claim 10, wherein the server computer verifies the signature in the synchronization message, verifies that the time is between a last epoch ending time and a current epoch ending time, and wherein the server computer, for each interaction in the interaction log, updates an online balance of the first device and an offline balance of another user device as indicated by the interaction log, generates a synchronization confirmation message and a signature of the synchronization confirmation message created using the server computer private key, and provides the synchronization confirmation message to the first device, wherein the method further comprises:

receiving, by the first device, the synchronization confirmation message from the server computer; and verifying, by the first device, the signature of the synchronization confirmation message using the server computer public key.

12. The method of claim 11, wherein a user of the first device loses possession of the first device, and wherein a secondary device is utilized by the user to provide generate a lost device balance recovery message and send the lost device balance recovery message to the server computer corresponding to the server computer public key, wherein the server computer adds a first device public key to a blacklist, waits until an end of the current epoch, updates the online balance of the first device based on synchronization of devices during the current epoch, and sets an offline balance of the first device to zero.

13. The method of claim 1, wherein the trusted application comprises trusted execution environment client APIs.

14. A first device comprising:

a processor, and a computer readable medium coupled to the processor, the computer readable medium comprising code, executable by the processor, to implement a method comprising:

receiving, from a server computer, an index value, wherein the index value is also stored at the server computer and is an interaction counter adapted to prevent replay attacks;

receiving, from a second device, an interaction request message comprising an amount of digital currency and a second device certificate during an interaction between the first device and the second device;

verifying the second device certificate in the interaction request message using a server computer public key corresponding to a server private key;

determining, by a trusted application in a secure element of the first device, whether or not the amount of digital currency is less than an offline amount of digital currency stored in the secure element;

when the amount of digital currency is less than the offline amount of digital currency, determining, by the trusted application, an updated offline amount of digital currency based on the amount of digital currency;

incrementing the index value by one to form an updated index value;

generating, by the trusted application, an interaction response message comprising the amount of digital currency, the updated index value, and a trusted application certificate;

signing, by the trusted application, the interaction response message comprising the amount of digital currency, the updated index value and the trusted application certificate using a trusted application private key to produce an interaction response message signature; and providing the interaction response message including the interaction response message signature to the second device, wherein the first device receives the interaction request message during an offline interaction between the first device and the second device.

15. The first device of claim 14 further comprising the secure element comprising the trusted application.

16. The first device of claim 14, wherein the interaction request message is received over a short-range communication channel and the interaction response message is provided over the short-range communication channel.

17. The first device of claim 14, wherein the interaction response message further comprises the second device certificate.

18. The first device of claim 14, wherein the offline interaction is an offline payment transaction.

19. The first device of claim 14, wherein the interaction request message is received over a short-range communication channel and the interaction response message is provided over the short-range communication channel, the short range channel comprising near field communications.

20. A method comprising:

generating, by a second device, an interaction request message comprising an amount of digital currency and a second device certificate;

providing, by the second device to a first device, the interaction request message, wherein the first device verifies the second device certificate in the interaction request message using a server computer public key corresponding to a server computer private key, determines whether or not the amount of digital currency is less than an offline amount of digital currency stored in a secure element on the first device, determines an updated offline amount of digital currency based on the amount of digital currency, increments an index value by one to form an updated index value, the index value being an interaction counter adapted to prevent replay attacks, generates an interaction response message comprising the amount of digital currency, the updated index value, and a trusted application certificate, and signs the interaction response message comprising the amount of digital currency, the updated index value and the trusted application certificate using a trusted application private key to produce an interaction response message signature;

receiving, by the second device, the interaction response message including the interaction response message signature; and temporarily storing, by the second device, the interaction response message, wherein the first device receives the interaction request message during an offline interaction between the first device and the second device.

\* \* \* \* \*